United States Patent
Venable

(10) Patent No.: US 6,557,017 B1
(45) Date of Patent: *Apr. 29, 2003

(54) IMAGE PRODUCTION SYSTEM THEME INTEGRATION

(75) Inventor: Dennis L. Venable, Marion, NY (US)

(73) Assignee: Xerox Corporation, Stamford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 09/243,245

(22) Filed: Feb. 3, 1999

Related U.S. Application Data

(60) Provisional application No. 60/073,898, filed on Feb. 6, 1998.

(51) Int. Cl.[7] ............... G06F 17/00; G06F 15/00; G09G 5/00
(52) U.S. Cl. ............... 707/502; 345/619; 358/1.15
(58) Field of Search ............... 707/502; 345/619; 358/1.15

(56) References Cited

U.S. PATENT DOCUMENTS

| | | | |
|---|---|---|---|
| 4,667,248 A | * 5/1987 | Kanno | 358/452 |
| 4,813,013 A | 3/1989 | Dunn et al. | 364/900 |
| 5,021,976 A | * 6/1991 | Wexelblat et al. | 345/853 |
| 5,353,388 A | * 10/1994 | Motoyama | 358/1.15 |
| 5,416,900 A | 5/1995 | Blanchard et al. | 395/155 |
| 5,485,568 A | * 1/1996 | Venable et al. | 345/589 |
| 6,111,586 A | * 8/2000 | Ikeda et al. | 345/619 |
| 6,288,789 B1 | * 9/2001 | Harada | 358/1.15 |

* cited by examiner

Primary Examiner—Joseph H. Feild
Assistant Examiner—Rachna Singh
(74) Attorney, Agent, or Firm—Michael J. Nickerson; Christopher D. Wait

(57) ABSTRACT

A method and device for describing a complex color raster image as a collection of objects in a hierarchical and device independent format. The purpose of structured imaging (SI) is to expand the scope of a raster image to a collection of individually manipulable component objects. An SI is a hierarchical description of a single output image raster which may be used as one component of a page in a structured document. Objects contributing to the output raster may originate from text, graphics, other rasters or a combination thereof, and all maintain their heritage for selectability and modification. The SI describes not only the source data but also the image processing operations required for rendering the output raster. SI technology supports re-editability, customization and enhancement, automatic image assembly and high performance imaging. Thus, such a model has implications not only in an image editing and processing arena, but also in the filing and printing services used for image handling. Importantly, the present invention describes how Structured Image themes which encapsulates many aspects of a particular document production system to render images into a single entity. A Theme definition includes a signature definition, a set (organization of related themes, and a specific template, background image, or background color for each page. Definitions are, for the most part, loaded from text files at run-time.

4 Claims, 16 Drawing Sheets

IMAGE PRODUCTION SYSTEM THEME INTEGRATION

The present invention claims priority over previously filed provisional application, application Ser. No. 60/073,898, filed in the U.S. on Feb. 6, 1998.

This invention relates to an image processor/generator for representing a complex color raster image as a collection of objects in a hierarchical and device independent format and, more particularly, the integration of themes within an image production system incorporating structured imaging which together provide a means by which background images, page templates, and signatures define how a custom photo presentation can be encapsulated.

BACKGROUND OF THE INVENTION

A critical need exists for an image processor in the commercial printing arena with the ability to create a job template for constructing multiple, customized images. Additionally, commercial image processing software packages, such as Photoshop®, have limited ability to render the output image optimized for the output device. Typically, color correction and simple resolution conversion is all that may be applied. Additionally, in typical commercial image processing software, the ability to edit the list of image processing operations performed by the operator is also very limited. Typical commercial software also does not allow for the optimization of image processing. That is, once an image is created, the ability to combine operations and increase performance on high resolution imagery is lost. Significantly, a critical need exists for software which enables attributes such as the size, location, and angle of objects within an image to be altered at the time the image is rendered. The present invention includes these advantages as well as the ability to change the syntax of the Structured Image Definition Language (SIDL), the ability to change image processing systems, potential optimization of image processing, and the ability to apply any or all constraints as desired.

Commercially available image development and management packages in use today require considerable memory to operate. For example, Adobe Photoshop® stores three copies of the full size raster during interactive editing. Thus, a typical 24-bit color image (8½×11 at 300 dpi) can require 24 megabytes of memory for each image copy. Commercial software often exhibits sluggish to poor performance when editing large imagery. Again, available software products must store, as discussed above, three copies of the image (no matter how large it is). Since every interactive operation processes the full image, performance is extremely slow. Further, typical commercial software stores output imagery as complete rasters. Therefore, for each new version of an image, a complete raster must be written out and you cannot undo the operations contained in those versions. At 24 megabytes per image, as discussed above, disk requirements can be extensive. Also, archiving such imagery can require extensive storage space as well.

A Structured Image (SI) describes a raster image as a collection of rasterizable objects and image processing operations. Structured Images are described in detail in U.S. Pat. No. 5,485,568 to Venable et al. issued Jan. 16, 1996, the disclosure of which is incorporated by reference. Briefly, the component objects are store din native formats which enables the editing of the image and objects. Structured Images provide a flexible and extensible means to describe how an image is created as opposed to what the result looks like. The notion of variable data imaging is supported through a mechanism called "delayed binding." Objects are defined as placeholders during the creation of the Structured Image. At render time, the placeholders are bound to real data through a database access or other means. In many cases, certain aspects of an object or its image processing must depend upon the nature of the object itself and/or other objects in the same Structured Image.

The present invention describes the notion of themes developed for photofinshing production systems which provide a means by which background images, page templates, and signatures that define a custom photo representation such as a photo album can be encapsulated. Specifically, with one aspect the invention a customer is allowed to select a document type to print with the customers photos, such as calendars, school picture packs, photo albums, event books, etc.

The following disclosures may be relevant to aspects of the present invention:

U.S. Pat. No. 4,667,248 to Kanno issued May 19, 1987 discloses a document image editing device that includes a page memory device and a display device. The page memory device stores in different areas thereof document images to be edited, image information (parts) of the cut partial image regions, and a pasteboard image for pasting the cut partial images. The display device displays the document images to be edited and the cut partial images in different display regions. The image editing is performed under the control of a CPU. In the cutting mode, partial images cut from the document images displayed on the display device are stored in memory locations of the corresponding areas of the memory device and are displayed at positions in the corresponding regions of the display device. In the pasting mode, the pasting positions of the cut partial images on the pasteboard are designated. The image information of the partial images is stored in the designated memory locations of the corresponding memory areas of the memory device and is displayed on the pasteboard on the display device. The pasteboard image on which the partial images are pasted in a desired layout is registered in a document image memory or printed out by a printer.

U.S. Pat. No. 4,813,013 to Dunn et al. issued Mar. 14, 1989 discloses an interactive rule based system which enables problem solutions to be generated in schematic diagram form. A methodology designer selects and arranges graphic primitives using a graphics terminal to create a library of icons. Under control of a computer processor, the methodology designer is prompted to identify, by way example, parameters for using each icon. The system generates and stores a specific set of rules pertaining to the use of each icon on the basis of the parameters identified. The stored rules are cross-referenced to the icon to which they pertain, so that whenever the icon is selected by a problem solving user for use in building a problem solution, the rules pertaining thereto will be accessed and applied. A methodology designer can also select and concatenate functions to each other and to icons to create more complex functions for use in building problem solutions. New functions can also be created in the form of truth tables which establish a transfer function across an icon. By accessing and selecting icons and functions created by a methodology designer, a problem solving user can build a solution to a problem by graphically coupling the icons and functions together on a chart.

U.S. Pat. No. 5,021,976 to Wexelblat et al. issued Jun. 4, 1991 discloses a method and system for generating dynamic, interactive visual representations of information structures within a computer which enable humans to efficiently process vast amounts of information. The boundaries of the information system containing the information to be processed are established and a set of mathematical relationships is provided which indicates the degree of correlation between parameters of interest to a user and segments of information contained within the boundaries. A visual display is generated for the user which has a plurality of different iconic representations and visual features corresponding to the parameters defined by the mathematical relationships. The iconic representations and visual features of the visual display change with the movement of the mathematical relationships within the boundaries of the information system according to the degree of correlation between the parameters of interest and the segment of information through which the mathematical relationships are passing.

U.S. Pat. No. 5,353,388 to Motoyama et al. issued Oct. 4, 1994 discloses a document processing system controls the printing of documents represented in page description language form. Documents are represented by a page description language which is structured so that definition and declaratory commands are positioned only at the beginning of each distinct document segment. Each document has prologue sections, which contain definition and declaratory commands, and content portions which contain the specific tokens or commands for defining specific images. The definition and declaratory commands in the prologue sections of the document are arranged in a hierarchical tree so that each definition and declaratory command has a scope corresponding to the portion of the hierarchical tree subtended by that command. A structure processor handles resource declaration and definitions, dictionary generation, context declarations and references to data external to the document. A content processor processes the tokens using the definitions and declarations set up by the structure processor, and an imaging driver module translates the document into commands suitable for any of several types of printers, as well as for communication by telephone line to a remote device. One feature of the document processing system is the ability to query a remote device to determine whether it has the resources required for processing a document transmitted in a high level encoded form. It then either transmits the document in rasterized bit map form if the required resources are not available, or transmits the document in a higher level encoded form if the required resources are available.

U.S. Pat. No. 5,416,900 to Blanchard et al. issued May 16, 1995 discloses a presentation manager including a module for representing a graphical object on a page, the graphical object having a size and a placement on said page; a module for representing a container object that is associated with the page, the container object having a set of specified characteristics; a module for dragging the graphical object to another location on the page; and a module for linking the graphical object to the container object when the graphical object is dragged into the container object, wherein the linking module creates an active link to the container object when the graphical object is dragged into the container object, wherein the active link imposes the set of specified characteristics on the graphical object.

U.S. Pat. No. 5,485,568 to Venable et al. issued Jan. 16, 1996, discloses a method and device for describing a complex color raster image as a collection of objects in a hierarchical and device independent format. The purpose of structured imaging (SI) is to expand the scope of a raster image to a collection of individually manipulable component objects. An SI is a hierarchical description of a single output image raster which may be used as one component of a page in a structured document. Objects contributing to the output raster may originate from text, graphics, other rasters or a combination thereof, and all maintain their heritage for selectability and modification. The SI describes not only the source data but also the image processing operations required for rendering the output raster. SI technology supports re-editability, customization and enhancement, automatic image assembly and high performance imaging. Thus, such a model has implications not only in an image editing and processing arena, but also in the filing and printing services used for image handling.

J. Schonhut, H. Wiedling and V. Samara, "Constructive Page Description," IEEE Computer Graphics & Applications Journal, March 1991, pages 71–78.

J. Andre, R. Furuta and V. Quint, "Structured Documents" Cambridge Series on Electronic Publishing, 1989.

Yoshimoto et al., "Interactive Iconic Programming Facility in Hi-Visual", IEEE Computer Society Workshop on Visual Languages, pp. 34–41, June 25–27,1986.

Ichikawa et al., "Visual Programming-Toward Realization of User-Friendly Programming Environments", ACM and IEEE Computer Society Fall Joint Computer Conference, pp. 129–137, 1987.

Hirakawa et al., "A Generic Model for Constructing Visual Programming Systems", IEEE Workshop on Visual Languages, pp. 124–129, 1989.

Smith, "Building Interfaces Interactively", Proceedings of the ACM Siggraph, Symposium on User Software, October 17,1988, pp. 144–151.

Wyvill, "Space Division for Ray Tracing in CSG", IEEE Computer Graphics and Applications, vol. 6, No. 4, pp. 28–34, April 1986.

Bier et al., "Gabriel: A Design Environment for DSP", IEEE Micro, vol. 10, No. 5, pp. 28–45, October 1990.

Chang, "Visual Languages", IEEE Software, pp. 29–39, January 1987.

Hirakawa et al., "An Iconic Programming System, HI-Visual", IEEE Transactions on Software Engineering, vol. 16, No. 10, pp. 1178–1184, October 1990.

Microsoft Paintbrush, Microsoft Corp., pp. 11–20, 1986.

Zilles et al., "The Escher Document Imaging Model", ACM Conference on Document Processing Systems, pp. 159–168, December 1988.

All of the references cited herein are incorporated by reference for their teachings.

SUMMARY OF THE INVENTION

The invention provides a method and system for developing image themes with the use of an electronic structured image generator, including: means for generating a representation of at least one raster image using at least one output structured image capable of being displayed and printed, the at least one output structured image being generated as a result of performing at least one image processing operation on at least one structured image object; means for constructing and displaying at least one structured image, the structured image comprising a pasteboard having at least one adjustable image attribute, the at least one adjustable image attribute being dynamically configurable based upon a nature of the attribute, the pasteboard representing a frame onto which the at least one structured image object is rendered, and a structured image definition that describes a structured image formation process used to generate the at least one structured image, the structured image definition including at least one interconnected image processing operation performed on the at least one structured image object and merged to form the at least one output structured image; means for controlling the generating means and for controlling the constructing and displaying means to form and modify the structured image definition including the at least one adjustable image attribute of the pasteboard, wherein the means for generating at least one output structured image in response to the structured image definition, including the at least one adjustable image attribute of the pasteboard, generated by the structured image constructing and displaying means is controlled by the means for controlling so as to generate the at least one output structured image; and means for at least one of displaying and printing the at least one output structured image in response to at least one of computer program instructions and operator inputted commands.

In accordance with another aspect of the invention there is provided a process for electronically generating a representation of at least one raster image using structured images, which includes the steps of selecting at least one structured image object stored in a memory to be rendered onto a pasteboard, the pasteboard including at least one adjustable image attribute, the adjustable image attribute being dynamically configurable based upon a nature of the attribute, the at least one structured image object and the pasteboard defining at least one output structured image to be generated by a generation device; selecting at least one image processing operation to be performed on the at least one structured image object to form at least a portion of a structured image definition used to generate the at least one output structured image; generating the at least one output structured image in accordance with the at least one adjustable image attribute of the pasteboard; and at least one of displaying and printing the at least one output structured image responsive to at least one of computer program instructions and operator inputted commands.

In accordance with yet another aspect of the invention, there is provided a process for constructing a representation of at least one raster image using at least one output structured image, wherein the at least one output structured image comprises at least one structured image object that is rendered onto a pasteboard having at least one adjustable image attribute, the at least one structured image object being contained within a structured image definition, the structured image definition including at least one interconnected image processing operation performed on the at least one structured image object that is merged onto the pasteboard to form the at least one output structured image, the process including the steps of defining the at least one adjustable image attribute of the pasteboard; selecting the at least one structured image object stored in a memory to be rendered onto the pasteboard and a component of the at least one output structured image to be generated by a generating device; selecting at least one image processing operation to be performed on the at least one structured image object to form at least a portion of the structured image definition used to generate the at least one output structured image; dynamically configuring the adjustable image attribute based upon a nature of the attribute; generating the at least one output structured image by performing the at least one image processing operation on the at least one structured image object according to the structured image definition including the at least one adjustable image attribute of the pasteboard; and at least one of displaying and printing the at least one output structured image responsive to at least one of computer program instruction and operator inputted commands.

Other advantages and salient features of the invention will become apparent from the detailed description which, taken in conjunction with the annexed drawings, disclose the preferred embodiments of the invention.

BRIEF DESCRIPTION OF THE DRAWINGS

Other features and advantages of the present invention will become apparent as the following description proceeds and upon reference to the drawings, in which.

DESCRIPTION OF AN EMBODIMENT OF THE INVENTION

A. System Overview

Structured Imaging (SI) is a hierarchical description of a composite raster image composed of component images (i.e., child objects) and the image processing operations (IPOs) necessary to render the output raster image. Any data type that can be rendered as a raster is a potential component of an SI. SI is an enabler for the creation and manipulation of complex images easily and quickly for inclusion into printed documents.

Figure 1:
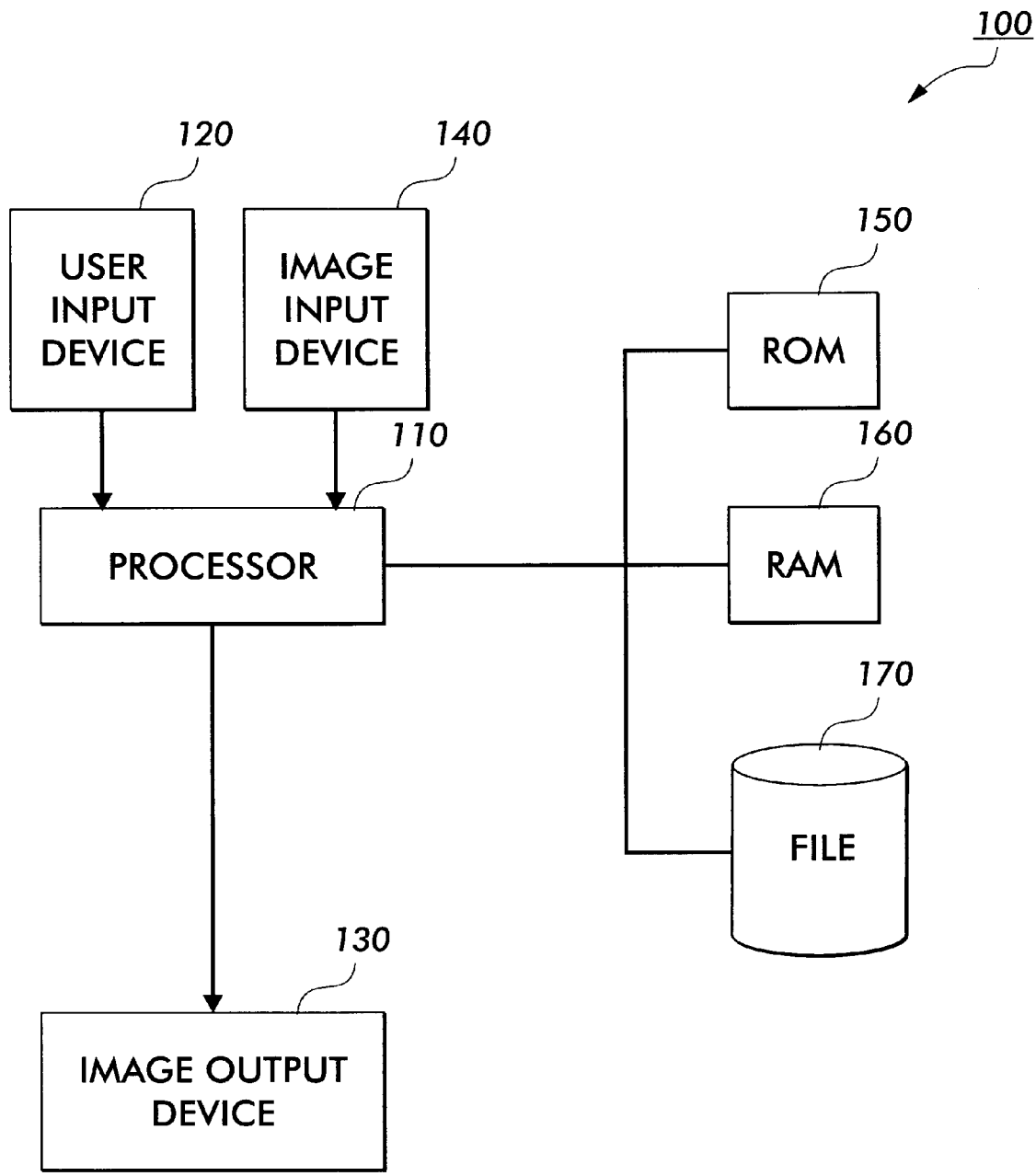
FIG. 1 is a block diagram showing general components that can be used with the invention.

SI can be implemented (see FIG. 1) on a conventional hardware system 100 which includes a microprocessor 110 for receiving signals from, and outputting signals to, various other components of system 100 according to one or more software programs run on a microprocessor 110. A user input device 120 such as, a mouse, a keyboard, a touchscreen and/or combinations thereof is provided for permitting an operator to interface with SI by, for example, supplying control signals thereto. An image output device 130, such as, a video display monitor, or a printer can be provided for outputting SI data. An SI input device 140, such as, a scanner can be provided for scanning images which are then stored in memory as image sources. Image sources can also be supplied from, for example, disks.

The microprocessor 110 includes a read-only memory (ROM) 150 for storing operating programs and image data, used by SI to construct and edit images. A random access memory (RAM) 160 is provided for running the various operating programs and additional files 170 can be provided for RAM overflow.

Importantly, however, SI can also be implemented into embedded systems (not shown), as well as networked systems where the various hardware components are networked and may or may not reside in the same location (also not shown). There is no requirement that the hardware system be hard-wired. The above described conventional hardware system is provided for example only and is no more preferred than the embedded or networked systems.

A1. Structured Imaging Defined

An SI is defined by an "object" which is a representation of data that can be rendered into a raster image, and a "pasteboard" that represents a "frame" for the object to be rendered onto. An SI does not have absolute size specified within the SI description. The size of each sub-object is stored within the pasteboard as a size relative to the sub-object's parent.

To convert an SI object into a raster image, the ReadObject( ) rendering procedure, see below, is invoked through appropriate command instructions using, for example, the user input device 120, with the object, pasteboard, and absolute dimensions of the parent object as parameters. The SI object and any child objects will be rendered to the proper output size automatically. An SI is described by a Structured Image Definition (SID) file.

It should also be understood that an SI object may be automatically scanned into the SID using appropriate SI scanning software. Thus, interactive editing is by no means the only method of creating or preparing a SID for printing.

A2. Structured Image Object

Figure 2:
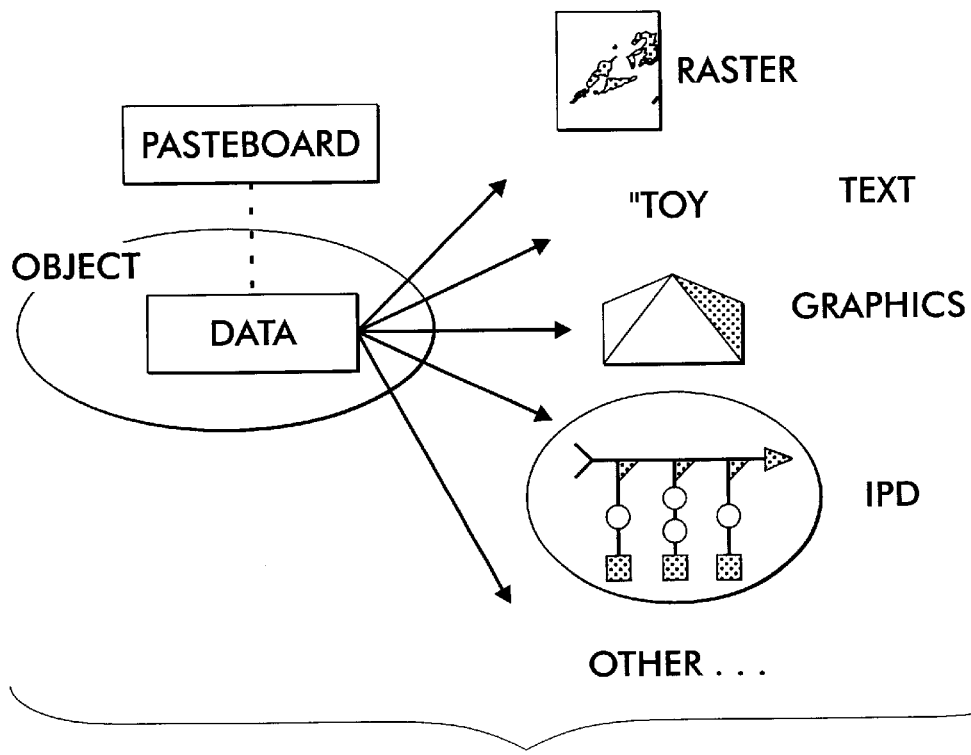
FIG. 2 is a graphic representation showing the variety of data types that make up an SI object.

An SI object is a representation of data (see FIG. 2) that can be rendered into a raster image. This data may represent simple raster images, such as, TiFF files, or more complicated data such as a hierarchical collection of sub-objects and associated raster processing operations. Possible object data types include:

1) raster image-TiFF, RES, or other digital display,
2) toy text-simple text annotation,
3) CGM graphics-simple graphical annotation,
4) IPD-SI image processing description,
5) MR file-file containing a description of multiple image representations.

An important feature of SI technology is the ability to store image processing operations (IPOs) within the SID. The object data type IPD provides the mechanism for storing IPOs, as will be discussed in greater detail below.

Figure 3:
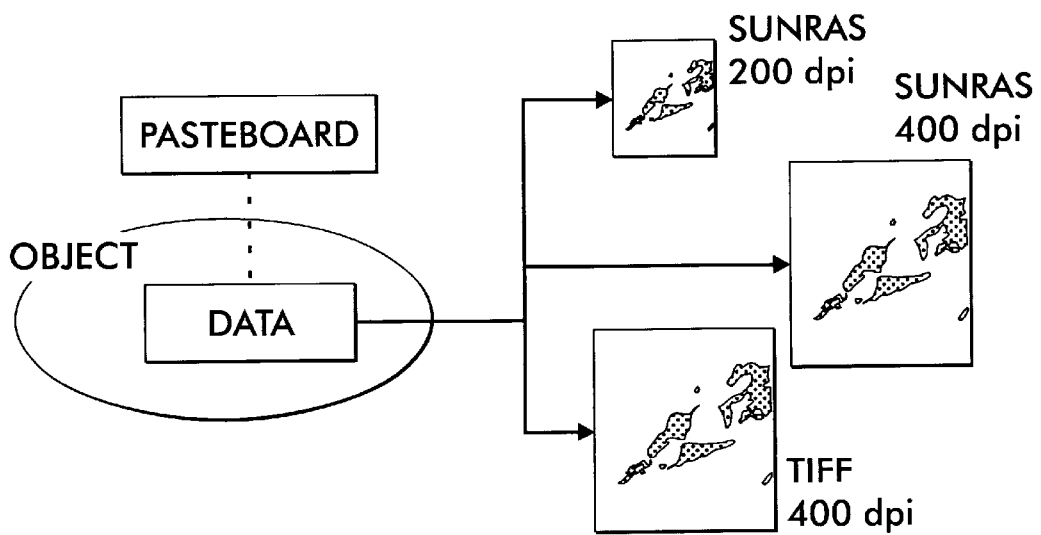
FIG. 3 is a graphic representation showing an example of the Multiple Representations (MR) that make up an SI object.

A single SI object may represent more than one data type and/or data file. For example (see FIG. 3), a single SI object may reference a directory containing several TiFF files stored at different resolutions. Each TiFF file represents the same image, but has different absolute pixel dimensions and photometry. This concept is known as multiple representations (MR). SI specifies multiple representations to be determined dynamically, but the MR file format is defined for those applications that require explicit specifications of multiple representations (as will be described below).

The topmost object in an SI, i.e., the object which has no parent, is called the root object. This will be described in greater detail in the discussion of the object rendering process below.

A3. Pasteboard

The pasteboard is the "frame" into which SI objects are rendered. Several attributes can be specified within the pasteboard (see FIG. 3): 1) RelativeSize; 2) Angle; 3) FitMode; 4) Justification; and 5) ControlPoint.

The pasteboard specifies the size of the rendered object relative to its parent object. For example, the pasteboard applied to a sub-object may specify a size such as (1.0,0.5) relative to the parent object, where (1.0,0.5)=width and height ratios. At render time, if the parent is specified to render at (1000×2000) pixels, the sub-object would be rendered at (1000×1000) pixels since the pasteboard dimension specified that the subobject to render at the full width but half the height. The default relative size is (1.0,1.0).

Figure 4:
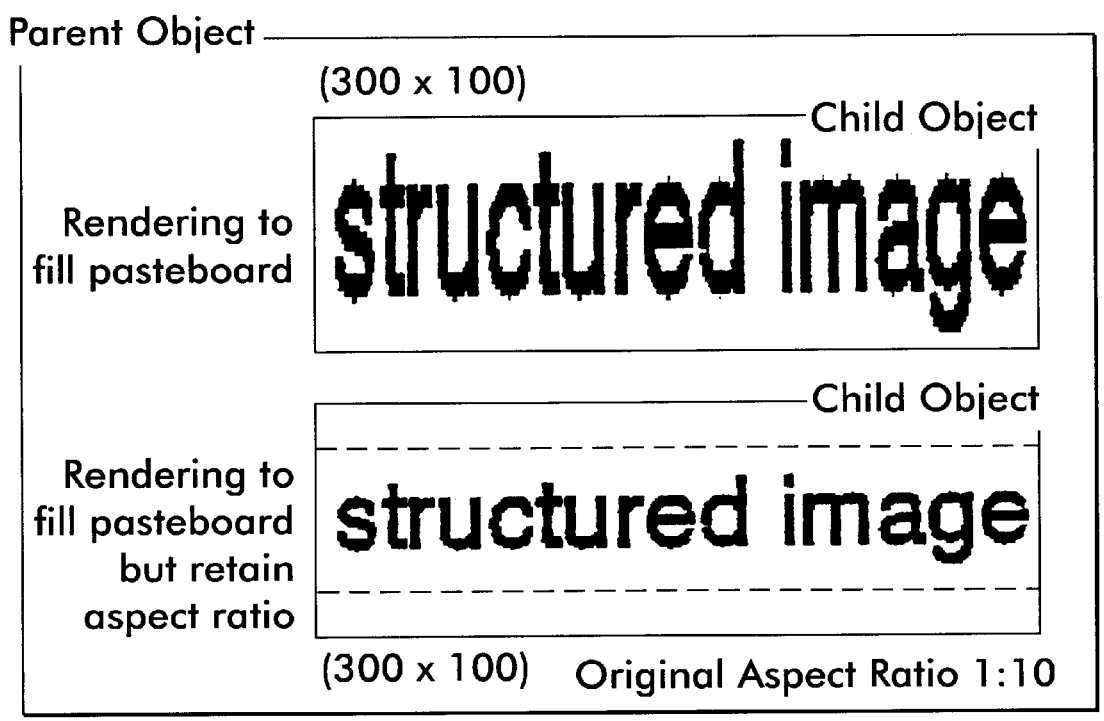
FIG. 4 is a graphic representation showing rendering to maintain the Aspect Ratio.

When rendering an SI, relative size of the pasteboard is used to determine the absolute size of the pasteboard based on the absolute size of the parent object (see FIG. 4). However, for reasons of optimal quality rendering, it may be preferable to have the child object render to different absolute dimensions than the dimensions determined by the pasteboard and parent size. For example, consider the child object to be a TiFF file of scanned text with an aspect ratio of 10 to 1 (width to height). Consider the associated pasteboard to have a relative size of (0.67,0.33). Let the parent object be rendered to an absolute size of (450×300) pixels. Therefore, the child pasteboard has an absolute size of (300×100). If the TiFF file were scaled to fit this window, it would be stretched by a factor of 3 in the y-direction, which would greatly distort the text. In this case, it might be preferable to render the text in the original aspect ratio to fit the desired pasteboard, the TiFF file might be scaled to dimensions (300×30) to maintain the 10 to 1 aspect ratio (width to height).

Figure 5:
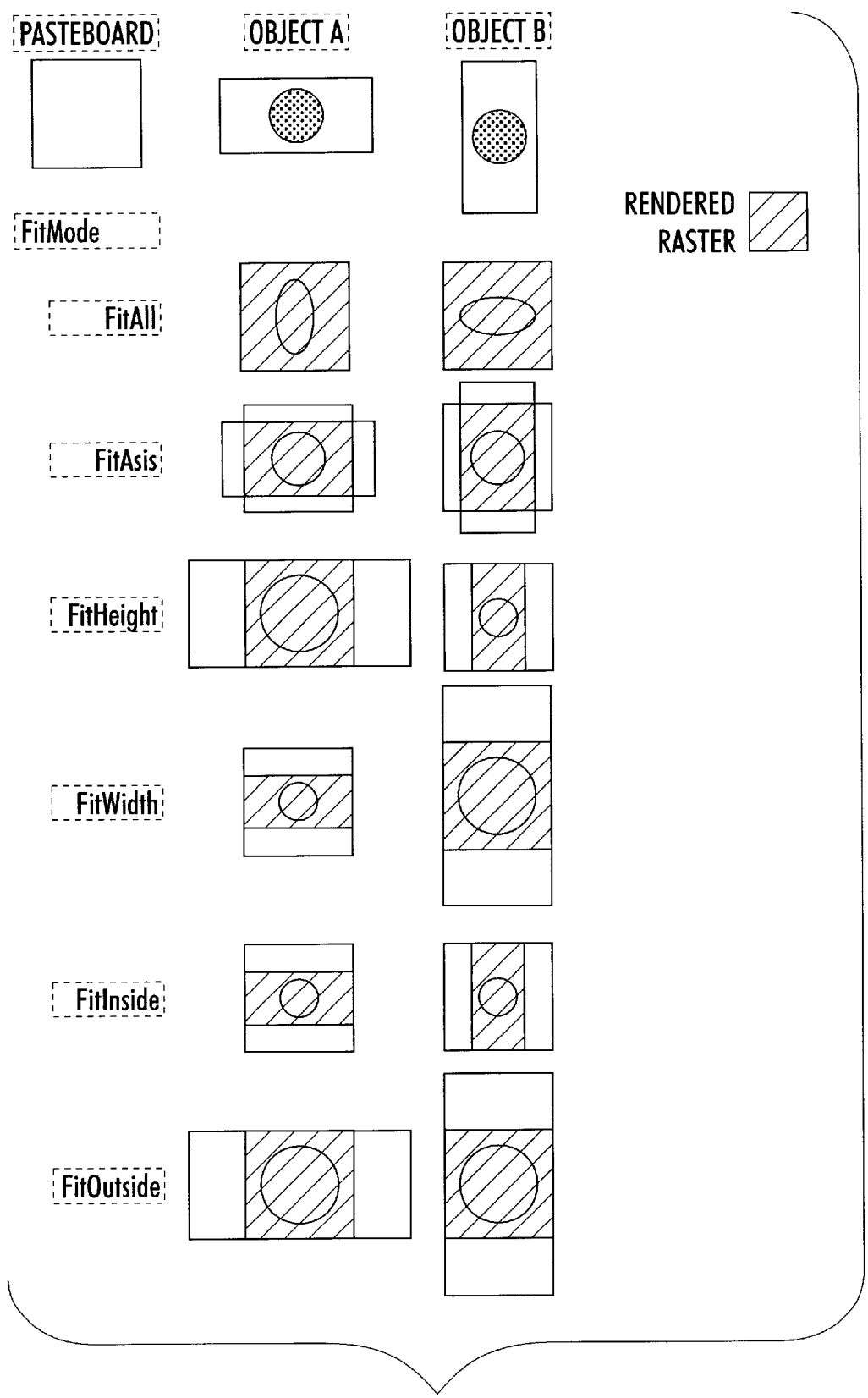
FIG. 5 graphically demonstrates the available FitMode models which define how rasters are rendered in the dimensions defined by the pasteboard in accordance with the invention.

To support this type of rendering, SI defines six FitMode attributes (see FIG. 5) to define how rasters are rendered in the dimensions defined by the pasteboard. These FitModes are defined in FIG. 5. All modes, except FitAll, retain the aspect ratio of the object. However, the raster image actually rendered is always limited by the pasteboard size. Therefore, the actual size of the rendered raster is defined by the intersection of the pasteboard size and the size of the rendered object according to the specified FitMode. In FIG. 5, the rendered object for the FitOutside mode is significantly larger than the pasteboard, but the actual rendered raster is limited by the pasteboard. For the Fitinside mode, the object is rendered to fit the pasteboard while maintaining the aspect ratio. Therefore, the actual rendered raster may be smaller than the pasteboard dimensions if the aspect ratio of the object does not match that of the pasteboard. The default FitMode is FitInside.

Figure 6:
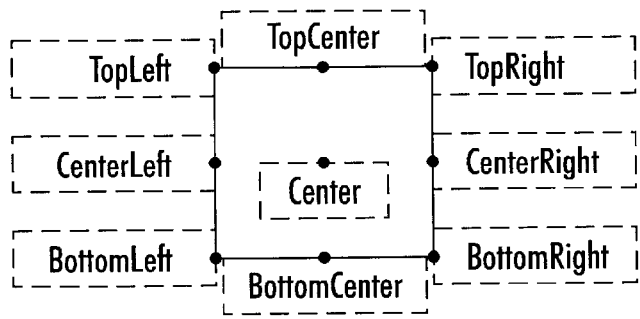
FIGS. 6 and 7 graphically demonstrate the Justification attribute of the invention, with FIG. 6 showing how the Justification attribute is used to specify the rendered raster to be positioned within the pasteboard at one of nine possible locations, and FIG. 7 showing 3 examples of the Justification attribute.
Figure 7:
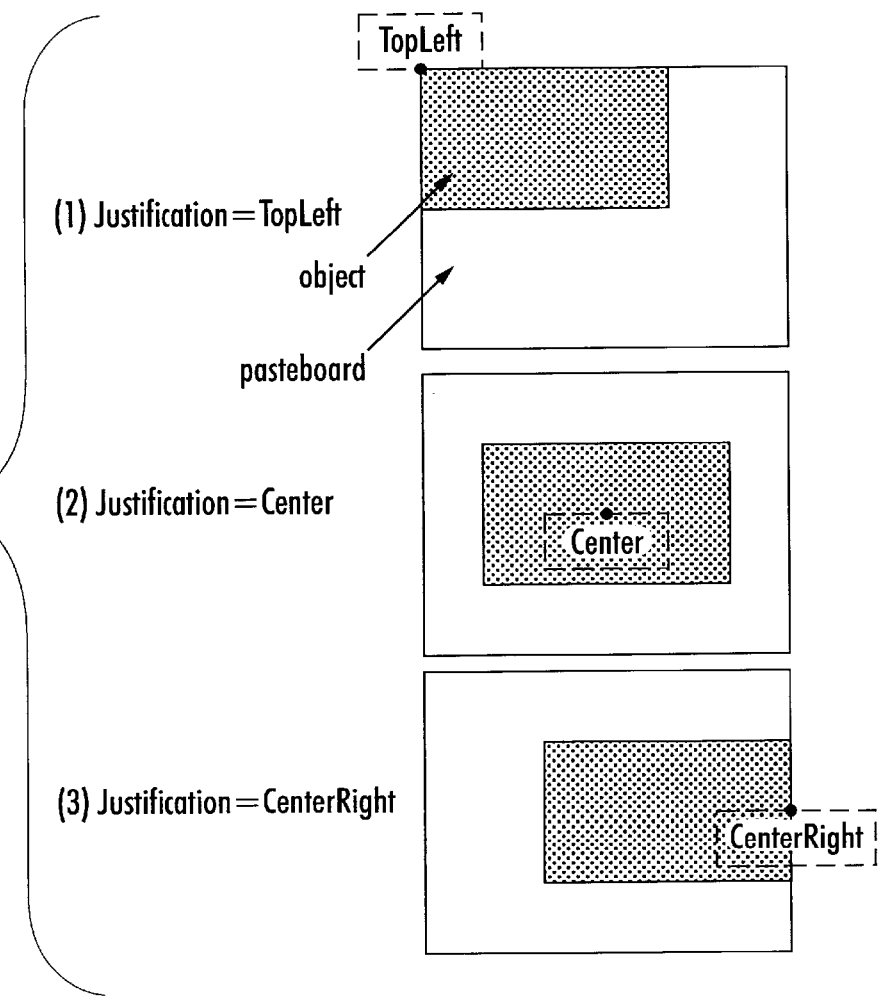

SI objects can be rendered using the FitModes defined above, however, for some applications, it may be desirable to provide control over the location of the rendered raster relative to the size of the pasteboard. The Justification attribute is used to specify where the rendered raster is to be positioned within the pasteboard at one of nine possible locations, as shown in FIG. 6, with examples shown in FIG. 7. The default Justification is Center. The Justification attribute is ignored if the FitMode is FitAll.

Figure 8:
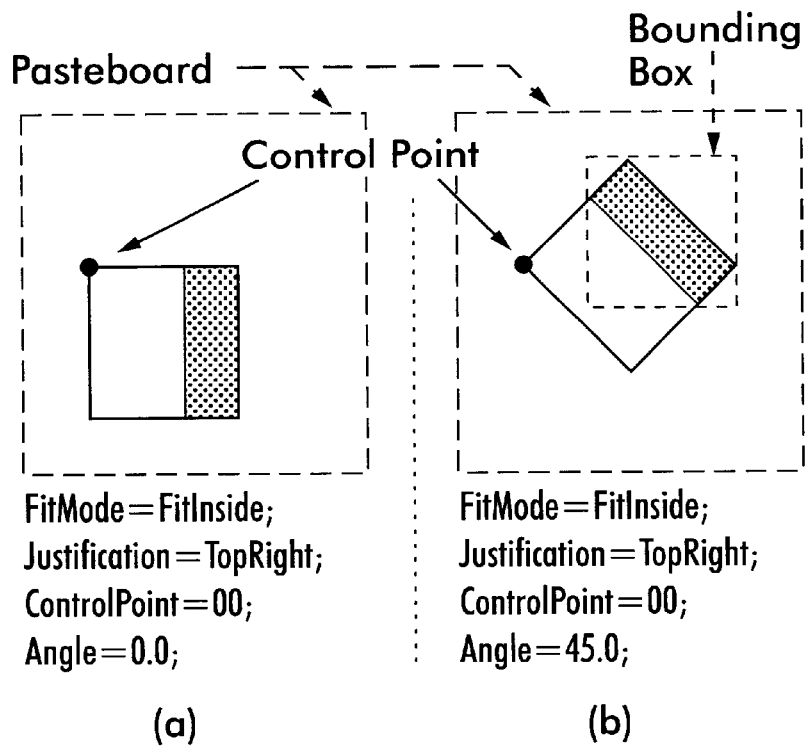
FIG. 8 graphically demonstrates the Angle attribute of the invention, where the (a) side of FIG. 8 shows the unrotated pasteboard and the (b) side shows the rotated pasteboard (note: the object is rotated around the Control Point)

Each object may have an Angle attribute used to rotate the rendered object. The effect will be to render the object into the specified pasteboard, then rotate the pasteboard around the ControlPoint (see below) by the specified Angle in degrees (see FIG. 8). It is the responsibility of the object rendering program being used to properly handle rendering the object at the specified Angle. Some rendering programs may be able to optimally render objects at the appropriate Angle; other renderers may invoke a raster rotation program after initial object rendering. This choice is implementation dependent. The actual size of the rendered raster will be a bounding box of the rotated, rendered object as shown in FIG. 8b. The default rotation angle is 0.0 degrees.

In the case of a parent object composed of a set of child objects, each child is rendered and merged onto the parent's pasteboard at a location known as the MergePoint. The MergePoint is specified relative to the parent object's pasteboard. The ControlPoint is the corresponding point relative to the child's pasteboard. The ControlPoint of the child is to align with the Merge Point of the parent. For example, a ControlPoint of (0.5, 0.5) results in the child being centered on the Merge Point. The default ControlPoint value is (0.5, 0.5).

The ControlPoint (together with the MergePoint) controls where a rendered child object is merged onto a parent object's pasteboard. Within the SID, the ControlPoint is specified and the pasteboard associated with the child object in coordinates relative to the child's pasteboard. However, a rendered child object will not necessarily fill the specified pasteboard depending on the FitMode and the Angle attributes. Thus, the rendering programs for each object must automatically adjust the ControlPoint to maintain the same relative position with respect to the rendered child.

Figure 9:
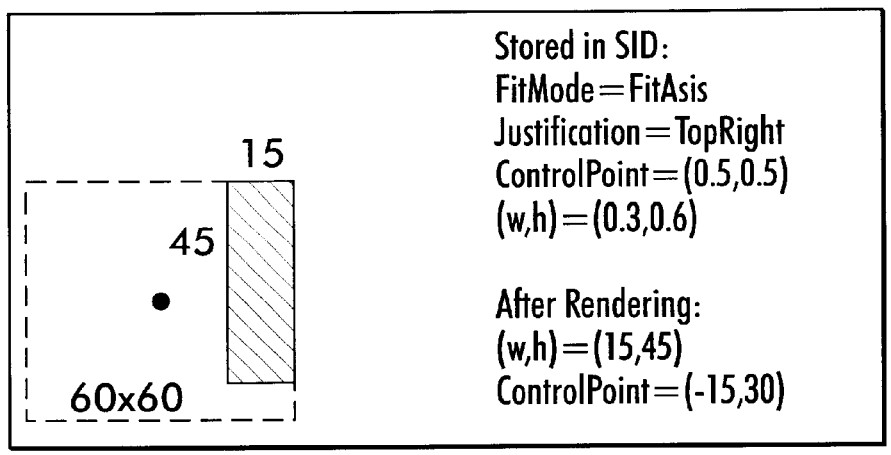
FIG. 9 is a graphic representation showing a rendering adjustment of ControlPoint in accordance with the invention.

Consider the example shown in FIG. 9. The ControlPoint is initially at the center of the child (0.5, 0.5). After rendering with the FitAsIs mode with the child justified to TopRight, then ControlPoint will be automatically adjusted to absolute value (−15,30). This will cause the merge operation to position the rendered raster at the expected position. To understand this example, the child is specified in the SID to have size (0.3,0.6). The rendering indicates the parent is (200×100), thus, the requested child size is 60×60. However, the FitMode indicates FitAsIs. The actual child is stored at 15×45, so the rendered raster will be 15×45. The Justification indicates TopRight, so the 15×45 raster is positioned at the TopRight of the 60×60 requested size, such that the origin of the rendered raster is at (45,0) relative to the requested raster. Since the raster size that flows up the path is the size of the rendered child and not the 60×60 size of the requested child, the ControlPoint must be adjusted to reflect the shift relative to the actual rendered child. The ControlPoint is mapped to (30,30) relative to the requested child size. Since the rendered child's origin is at (45,0) relative to the origin of the requested size, it is easily seen that the ControlPoint is at (30−45, 30−0)=(−15, 30) relative to the rendered child (see FIG. 9).

ControlPoint information is stored into the header of the rendered raster image. In this manner, ControlPoint information is available to any IPOs that require knowledge of it. In particular, the SpatialTransform IPO must properly adjust the ControlPoint according to the specified transformation, as will be shown in the examples below.

A4. ReadObject

ReadObject( ) represents a procedure that converts an SI object into a raster image suitable for further processing. ReadObject( ) takes a pasteboard, an SI object (whether created or scanned in), and the absolute size of the parent object as parameters. In the case of the RootObject, the specified size is the desired output image dimensions and the relative size field of the pasteboard will typically be empty, implying the default value of (1.0, 1.0). Other information may be passed to ReadObject( ) if such information can be used to improve the quality of the object rendering.

ReadObject( ) performs several operations in order to render the appropriate raster image: 1) determines absolute pasteboard size; 2) determines all representations referenced by the object; 3) based on available information, chooses an appropriate representation for rendering; 4) renders data into raster according to FitMode, Justification and (possibly) Angle by invoking an appropriate rendering procedure; 5) rotates rendered raster to the angle specified by Angle attribute (if not performed in step 4); and 6) adjusts ControlPoint position. The output of the ReadObject( ) procedure is a raster image of the rendered object. The ControlPoint will be specified in the header of the raster image in the coordinate system of the raster image.

ReadObject( ) determines the absolute pasteboard size by multiplying the parent dimensions by the relative size specified in the pasteboard. If no pasteboard is specified, then a relative size of (1,1) is assumed. For example, if the specified size was (1000×2000) and the relative size (1.0,0.5), then the absolute size of the pasteboard will be (1000×1000). The actual rendered object may not be this size depending on the FitMode and Angle attributes, as discussed above.

An SI object acts as a reference to a data file, or representation, that can be rendered into a raster image. The representation may be one of several types, such as, raster, text and/or vector graphics. Also one object may reference several representations, each of which represents the same image but may differ in the storage format, size and/or resolution. When ReadObject( ) is invoked, it must determine which representation is the "best" representation to render by invoking the Finder( ) procedure. Finder( ) will locate all representations referenced by the object and will choose which representation is most appropriate for rendering.

Once a representation has been selected, it must be rendered into a raster image. Each supported data type must have a render procedure associated with it to convert the representation into a raster image. These render procedures must support the FitMode and Angle attributes. Preferably, the following data types are supported:

| DateType | Renderer | Example |
| --- | --- | --- |
| raster | render-raster( ) | TIFF, RES, PCX |
| simple text | render-text( ) | one line of text, one font |
| simple graphics | render-graphics( ) | CGM |
| pattern | render-pattern( ) | constant color |
| IPD | render-ipd( ) | |

The Render( ) procedure may incorporate the rotation angle directly into the object rendering, or it may apply a raster rotation operation to the rasterized object. For example, available text rendering programs have the ability to directly render text at a specified angle, resulting in better quality than a horizontal render followed by a raster rotation.

As previously discussed, the ControlPoint must be adjusted to keep the same relative position of the rendered object and the MergePoint depending on the Fit Mode, Justification, and Angle. It is the responsibility of ReadObject( ) to make this adjustment, and to insert the adjusted ControlPoint into the raster image header to make it available to any IPOs that may also adjust it (such as SpatialTransform).

A5. Finder

The ReadObject( ) procedure invokes the Finder( ) function to locate and return object data for rendering into an output raster image. The Finder( ) procedure performs six actions pursuant to the rendering of an SI: 1) locates all representations of the object; 2) identifies the type of each representation (TIFF, text, graphics); 3) determines attributes of each representation that are necessary for choosing the best representation; 4) applies a merit function to each available representation and selects the representation with the highest merit value; 5) returns a pointer to the representation data; and 6) returns the representation data type. The Finder( ) mechanism is necessarily dependent on the particular implementation. However, some statements as to functionality can be made.

The Structured Image Definition Language (SIDL), a simple language based on the notion of tags or macros, was created to describe Structured Images. In one embodiment of the SIDL, an SI object can be described in one of three ways (the following source code is subject to copyright protection, as discussed above, and can be executed on the hardware system previously described):

```
(1) Object = {
        External = {
            System = "UNIX ®"
            Name = "bird.TiF";
        };
    };
(2) Object = {
        Internal = {
            Bytecount = 1024
            Data = {
                . . .
            };
        };
    };
(3) Object = {
        IPD = {
```

-continued

```
            AspectRatio = 1.5;
            DefaultWidth=4in;
            . . .
        };
    };
```

An object defined as External is such that data referenced by the object is not stored within the current SID. Typically, the actual data is stored in a separate file. The System field is a description that the Finder( ) uses to understand how to locate the data. The Name entry is a set of key words that Finder( ) will use to actually locate the desired data. In the example above, Finder( ) is implemented to understand that a system entry of "UNIX®" indicates that the actual data will be found by searching an appropriate UNIX®" file system path for a file with the name entry of "bird.TiF". If the System entry had been "SYBASE®", then Finder( ) would treat the key words in the Name field as key words to search a SYBASE® database for the data.

An object defined as Internal contains the data stored directly within the SID. This is useful for storing small objects such as raster icons or simple text files directly within the SID, thus not requiring external storage.

IPD is an SI object data type that enables a structured image to be composed of other SI objects and IPOs. Based on the information stored within the SI object, Finder( ) must locate all available representations and determine the data type and any attributes required for choosing the "best" representation for rendering. The mechanisms/protocols used to implement these functions are not defined in SI, but it is understood that such mechanisms exist and are available for use herein.

Once all representations are determined, Finder( ) must choose the most appropriate representation to render into the output raster image. The mechanism is implemented by applying a merit function calculation to each representation. The exact merit function is implementation dependent and is not defined in the SI; however, it should be based on attributes of the representations, desired output image attributes, target output device (e.g., black and white printer, color display) and complexity of processing. Once a representation has been chosen, Finder( ) returns a pointer to the actual data and the data type to ReadObject( ) for processing to begin.

A6. Image Processing Definition (IPD)

Figure 10:
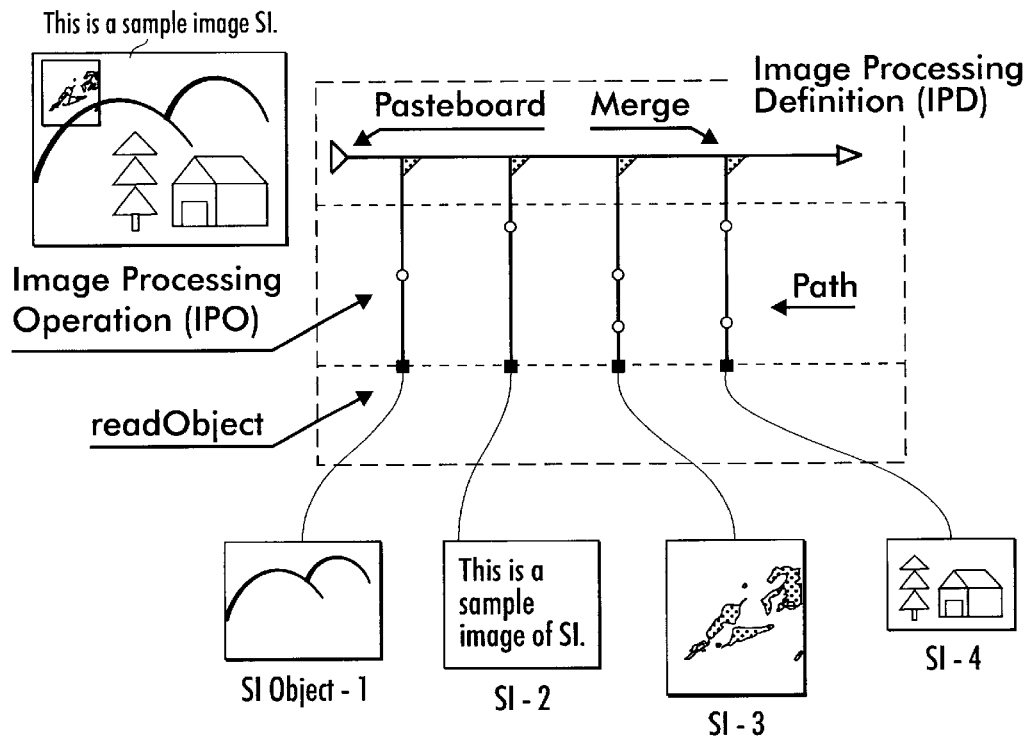
FIG. 10 is a graphic representation of an Image Processing Definition (IPD) as it relates to the output SI, which represents a structured description of references to component objects and Image Processing Operations (IPOs) applied to those component objects.

As discussed above, IPD is an SI object type that enables an SI to be composed of other SI objects and IPOs. IPD represents a structured description of references to component objects and IPOs applied to those component objects. FIG. 10 is a graphical representation of an IPD.

Figure 11:
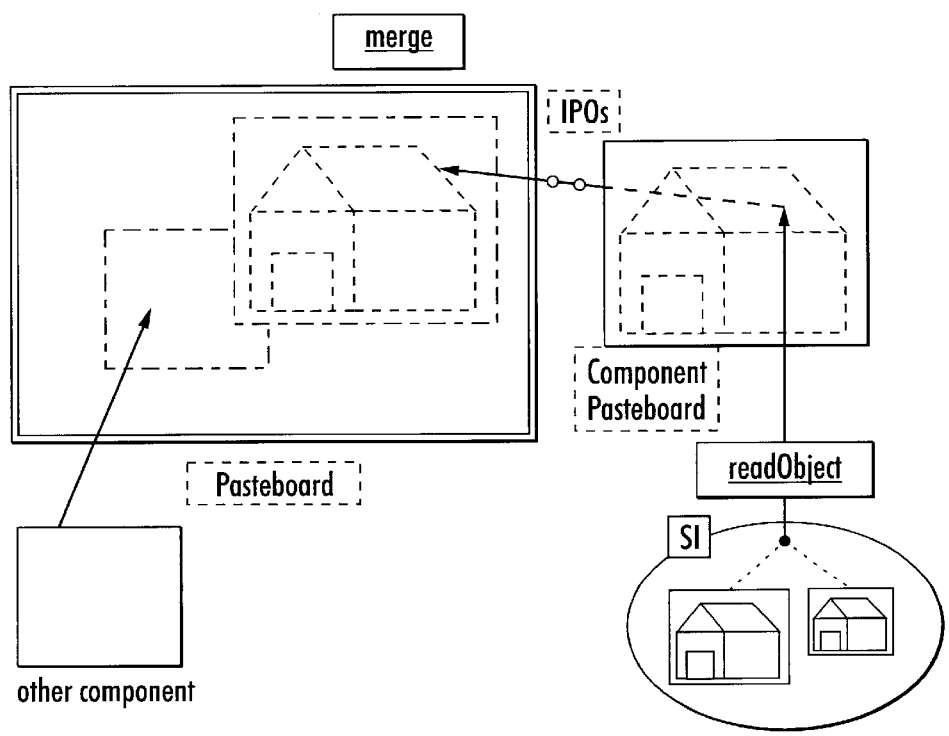
FIG. 11 depicts the flow of raster data during the rendering of an SI.

An IPD consists of references to the following descriptors: 1) default size; 2) ReadObject; 3) path; 4) IPO; 5) merge; 6) pasteboard; 7) initializer; and 8) component pasteboard. In FIG. 10, each vertical line, called a path, is a collection of IPOs. ReadObject represents a procedure that converts an SI object into a raster image suitable for processing by the IPO in the path. The rendered object flows through the path and is processed by each IPO sequentially. Each path has stored within it a pasteboard used by ReadObject to define a "frame" into which the SI object is rendered. This pasteboard is referred to as the component pasteboard. The horizontal line is the IPD object's pasteboard and represents a "blank" raster image onto which component pasteboards will be merged. The black triangles represent Merge operations where component pasteboards are combined onto the object's pasteboard. The merge order of component pasteboards is explicit, thus a sense of "top" and "bottom" images is supported. FIG. 11 depicts the flow of raster data during the rendering of an SI (i.e., the control flow from ReadObject to Merge).

Each IPD must include information which specifies a default size for the IPD. This information is used as a hint for the rendering programs as to the size the image was intended to be rendered to. In the current SIDL syntax, this information is preferably stored as an aspect ratio and a default width string. For instance,

```
IPD = {
    AspectRatio = 1.5
    DefaultWidth = 4 in;
    . . .
};
```

The AspectRatio field is defined by the ratio of height over width. The DefaultWidth field is a string defining a width and a unit. Possible units are: in, cm, mm, m, pt, and pix. IPOs are device independent descriptions of image processing commands. Only one IPO is currently specified in SI: the SpatialTransform IPO, which will be discussed in greater detail in the examples that follow. It is understood, however, that additional IPOs will be implementation dependent. Among these, certain fundamental functions are considered essential and are preferred IPOs as follows:

1) Transformer: spatially transforms the size or shape of an image (e.g., affine, warp);
2) Formatter: converts pixels from one format to another (e.g., convert, interleave, cspace);
3) Filter: applies various filtering operations (e.g., convolve, median, morphological);
4) Colorizer: adjusts color value of images (e.g., relative, absolute, contrast, white-point);
5) Mask: apply mask operations (e.g., add, extract, convert, apply); and
6) Misc.: apply other miscellaneous operations.

An IPO can specify the selection region of its operation. A selection is a description of which pixels in an image are to be processed in a specific operation. For example, a selection may include bitmaps or mathematical descriptions of regions. Normally, selections are binary in nature, i.e., a pixel is either processed or not processed. However, a "gray" selection value will cause the output pixel value to be scaled between the original pixel value and the processed pixel value.

Figure 12:
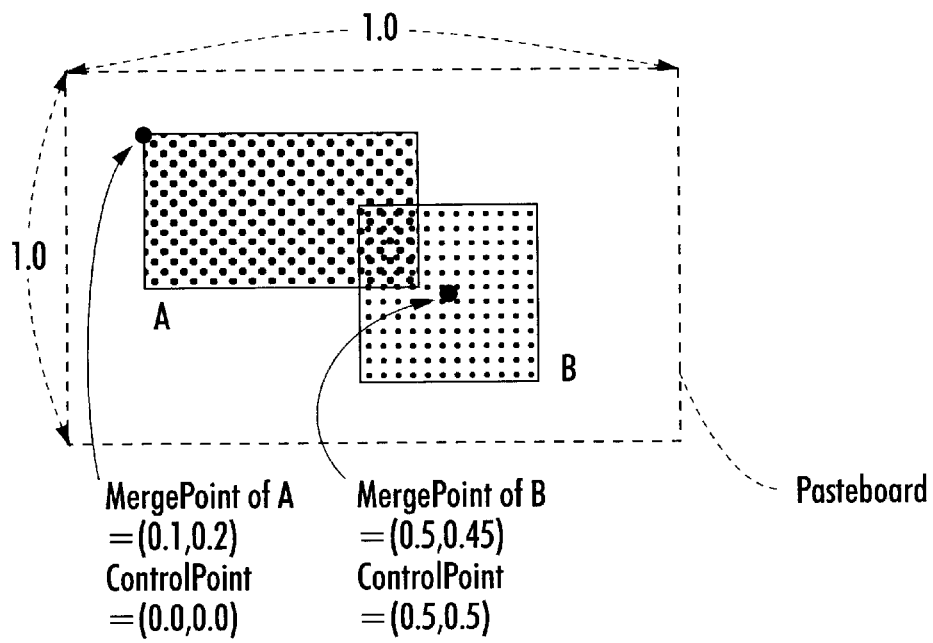
FIG. 12 is a graphic representation showing all child objects are merged into the parent pasteboard at the location specified by the MergePoint relative to the object pasteboard) and the ControlPoint (relative to the child pasteboard); PAGE 7

As shown in FIG. 12, all child objects in an IPD are merged into the parent pasteboard at the location specified by the MergePoint (relative to the object pasteboard) and the ControlPoint (relative to the child pasteboard). Merge order is explicit in the IPD.

Figure 13:
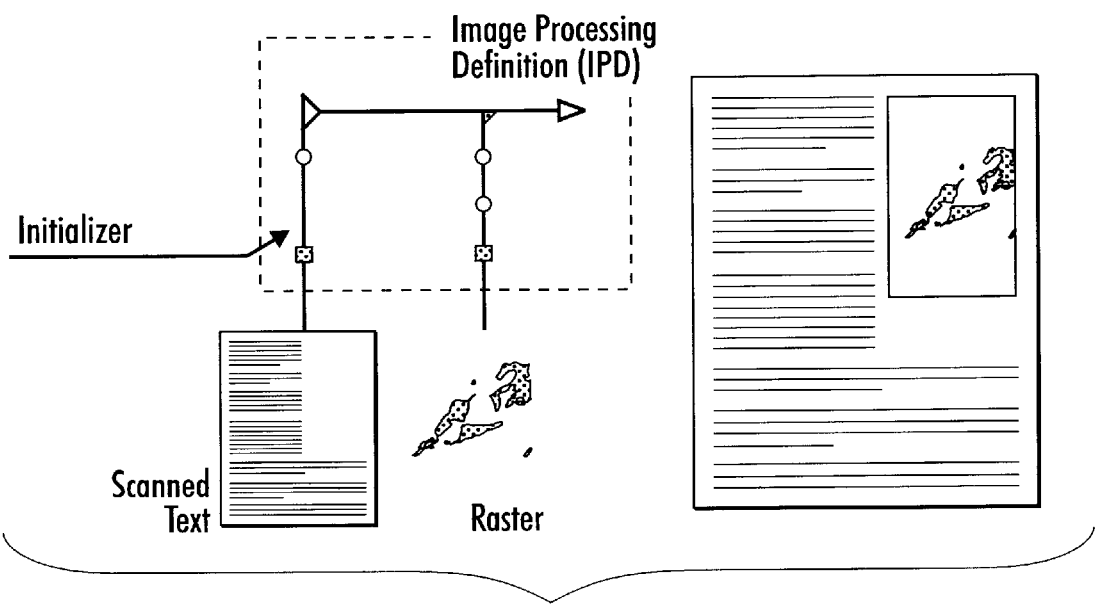
FIG. 13 is a graphic representation showing the pasteboard initializer function, in this case, initializing a pasteboard with a scanned text image.

Normally, the pasteboard of an IPD object represents a "blank" raster onto which component pasteboards are merged. It is possible to initialize a pasteboard with a color, pattern, or even a raster image using the Initializer (see FIG. 13). An Initializer is actually a Path that contains a ReadObject( ) and IPOs. The restriction is that the relative size be (1.0,1.0) and that no spatial transformation IPOs exist in the Path. The pasteboard will be tile size of the rendered Initializer. Typically the Initializer is used to colorize the pasteboard or to initialize the pasteboard with a background raster image.

B. Unbound/Incomplete Structured Images

The invention further allows for structured images to be defined that have fields within the SID identified as undefined. Such fields are place holders for data that will be dynamically bound to the SI and are run-time (render time) specific. There are two classifications for undefined fields: 1) Unbound SI; and 2) Incomplete SI.

B1. Unbound Structured Image

In general, component objects of an SI are not contained within the SID itself but are referenced by the fields of SI objects (such as the System and Name fields of an External object). Generally speaking, an unbound Structured Image is one in which some data objects contained therein are referenced but not specified within the SI, but are resolved to the SI at render time. In the current SIDL syntax, these fields can be labeled as undefined. This allows for the dynamic binding of data to the structured image.

Consider, for example, an interactive editing session where a user is creating an SI for printing. The SI is to be used only once, then discarded. The user creates the SI using an interactive SI editor (again, this is merely an exemplary way of creating the SI and is not necessarily any more preferred than creation by template or automatic creation using appropriate scanning software). All components of the SI are known and defined. Once completed, the user prints the SI and the job is complete. The SID generated to describe this SI is known as fully bound, meaning that all components were defined prior to rendering. That is, fully bound means that all objects in the IPD point to defined entities prior to the rendering of the output SI raster.

In many applications, however, fully bound images are not adequate for the job. Consider, for example, an advertiser generating a brochure in which one component of the image is to vary with geographic sales location. All possible images of this component are stored in a database. The advertiser can define the System entry of an External object to identify the database System, e.g., SYBASE®, but the Name field will be marked as undefined. At run-time, the correct key word can be dynamically bound to the object for generation of each requested output image. Using this method, a single SI can be used to generate many different output images. Unbound images are valid SIs, but they require additional information at runtime to be rendered.

Figure 14:
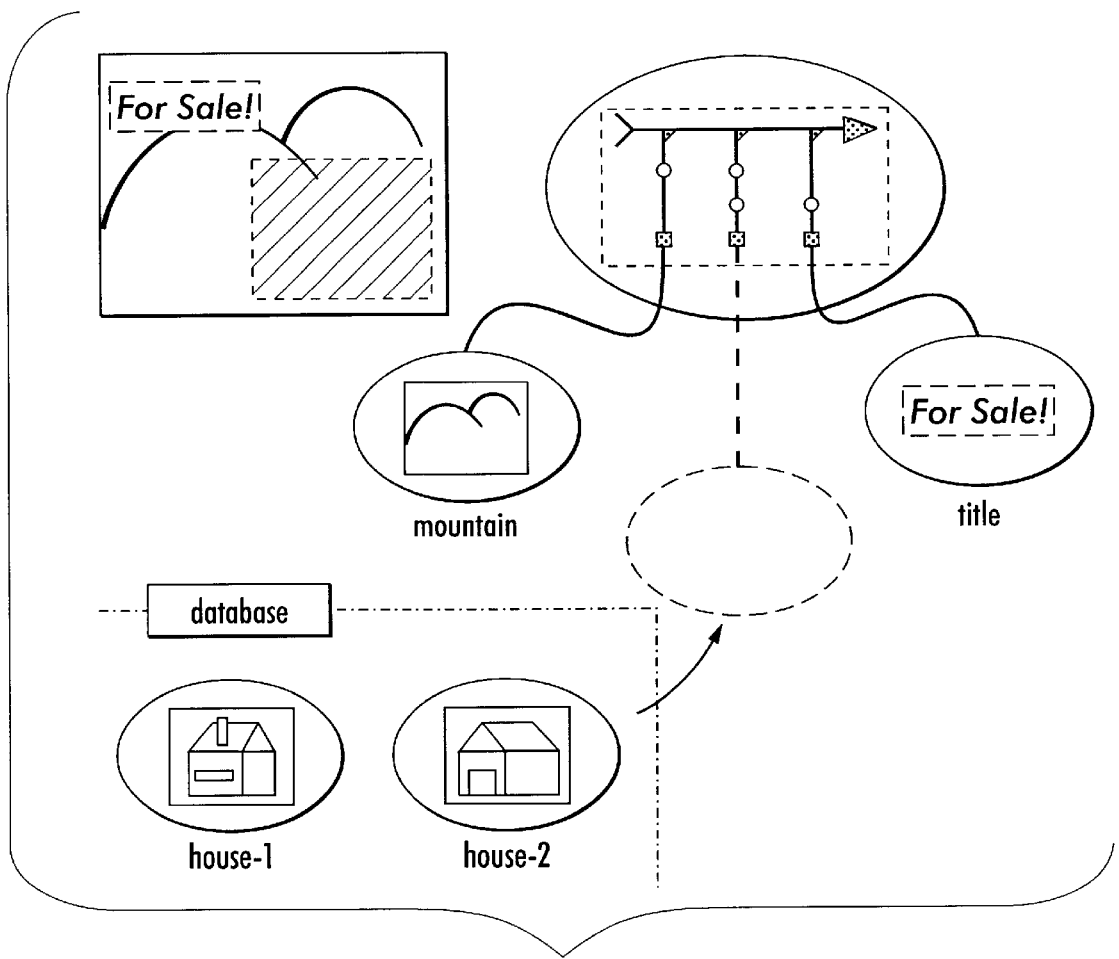
FIG. 14 is a graphic representation showing an Unbound SI (with respect to input objects) in accordance with the invention.

Notably, SI has no preference toward Bound or Unbound images, the choice is application dependent (see FIG. 14 for a representative user display using Unbound structured imaging).

B2. The Incomplete Structured Image

Figure 15:
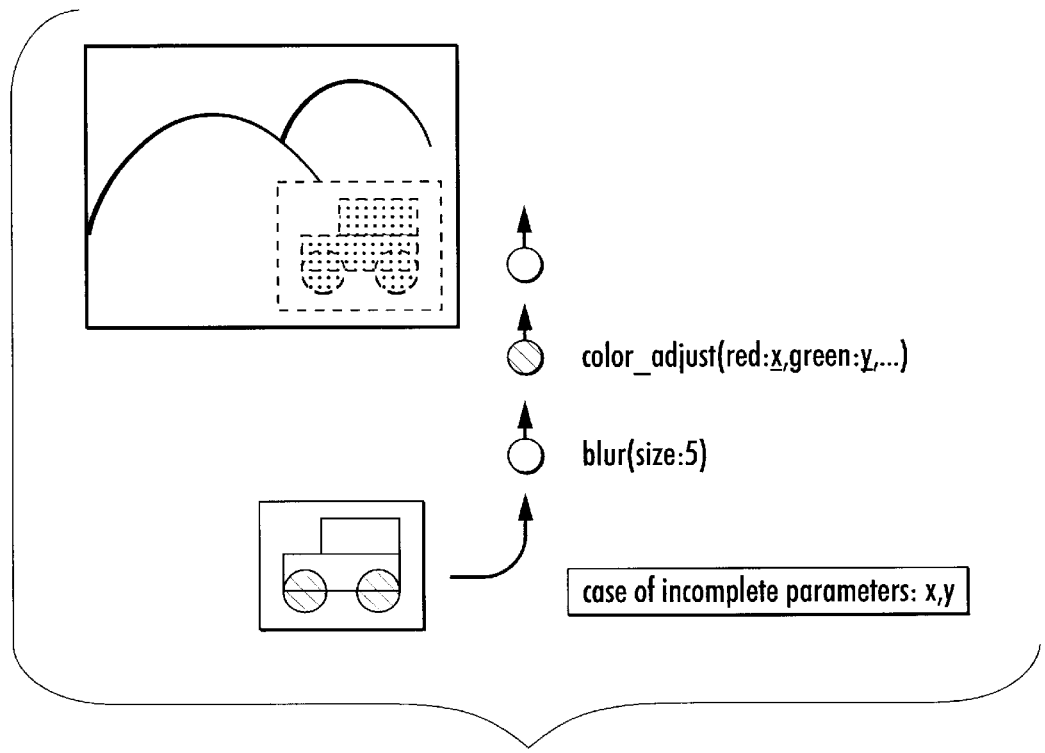
FIG. 15 is a graphic representation showing an Incomplete SI (with respect to image processing operations and/or attributes) in accordance with the invention.

Similar to the concept of Unbound images, the invention allows parameters of IPOs to be undefined. Also, an IPO itself may be undefined. For example, consider an advertiser creating a brochure containing automobile images in which the color of a car is to change between prints. The advertiser can have separate images of the car with all possible colors and use dynamic binding of the SID. The advertiser may also choose to use a single car image and pass the desired color as an argument to the render procedures to be dynamically bound to the IPO. Without the color value being provided at run-time, the rendering of the output raster could not be performed. This is known as an "incomplete" SI (see FIG. 15). An incomplete SI is one in which some part of the SID is not defined and must be bound at run-time. Incomplete SIs are valid SIs, but they cannot be rendered without additional information.

B3. Rendering Unbound/Incomplete Structured Images

There are two important considerations evident when rendering an unbound SI:
1) binding mechanism; and
2) rendering model.

The mechanism by which Unbound SIs are dynamically bound is implementation dependent. Four possible mechanisms are identified herein, however, others may be possible:

1) Require that SI always represents a "complete image"; if SI is unbound/incomplete, perform a prefiltering operation to modify SID.
2) Using current reference binding mechanism. The SID file can include undefined references and binding information as described in another file as "tag" definitions corresponding to undefined references in SIDL. Binding is realized, for example, by concatenating the SID file and the bind information to create a complete SID;
3) Specify the binding information as parameters to the SI renderer; or
4) Include a Dynamic Binding Method to the Finder( ) procedure that is invoked automatically to satisfy any unbound/incomplete field in the SID.

For purposes of the invention, all of the above described binding mechanisms are preferred, however, it is understood that the choice between the various mechanisms will be implementation dependent.

For certain applications, an SI may have fields that cannot be fully bound at render-time. For example, consider a document where each page is an SI containing six identical child objects that are to be bound at render-time, e.g., a real estate listing where each child object corresponds to a house for sale. Consider that the document is to display a total of nine houses. This would require two document pages, but only three of the child objects will be required on the second page. The SI renderer can operate in three models, although others may be possible: 1) fail with an unbound error; 2) ignore unbound objects, treat incomplete IPOs as non-operations; and 3) render only the pasteboard of unbound objects, treat incomplete IPOs as non-operations.

All three models are preferred for use with the invention, however, it is appreciated that the choice is application dependent.

Importantly, the present invention includes a method of modifying the pasteboard attributes at the time the image is rendered, in order to provide the ability to adjust the objects in the Structured Image as necessary. Constraints and Run Time Evaluators, two possible additions to the system thusfar described, can be used for this purpose.

C. Rendering

Although rendering is not specifically defined in the SIDL, a brief explanation is provided herein for clarity. In real rendering processes, some rendering methods can be selected according to conditions such as purpose, priority, resources and so on. Rendering is an implementation specific concern, however, it is understood that all implementations of SI rendering programs must produce equivalent output for a given SI and output device. It is not expected that results be exactly identical because slight differences in image processing programs will produce different results; however, the outputs must be reasonable. This statement is much like saying different C compilers do not have to generate identical machine code, but all compilers must generate working machine code.

Two approaches have been examined for rendering of SIs: 1) Object-oriented rendering; and 2) Processing-tree rendering.

C1. Object-Oriented Rendering

Figure 16:
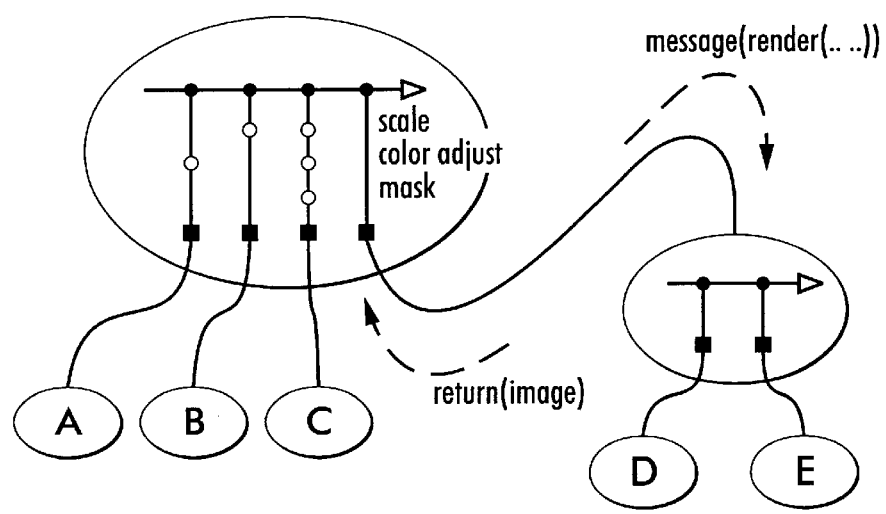
FIG. 16 is a graphic representation showing Object-oriented rendering in accordance with the invention.

Object-oriented rendering (see FIG. 16) is a method of top-down parsing of an object tree directly and rendering each object (SI) as you go. When an SI receives a message "render", it is rendered by given size and resolution attributes or dimension attributes. If other components are needed for construction of the SI, the object sends the "render" message to the component objects and gets the output images. Object-oriented rendering is direct execution of an object tree, which can best be thought of as "interpretation" of an object tree. Object-oriented rendering is especially suited for rendering in interactive editing situations.

C2. Processing-Tree Rendering

Figure 17:
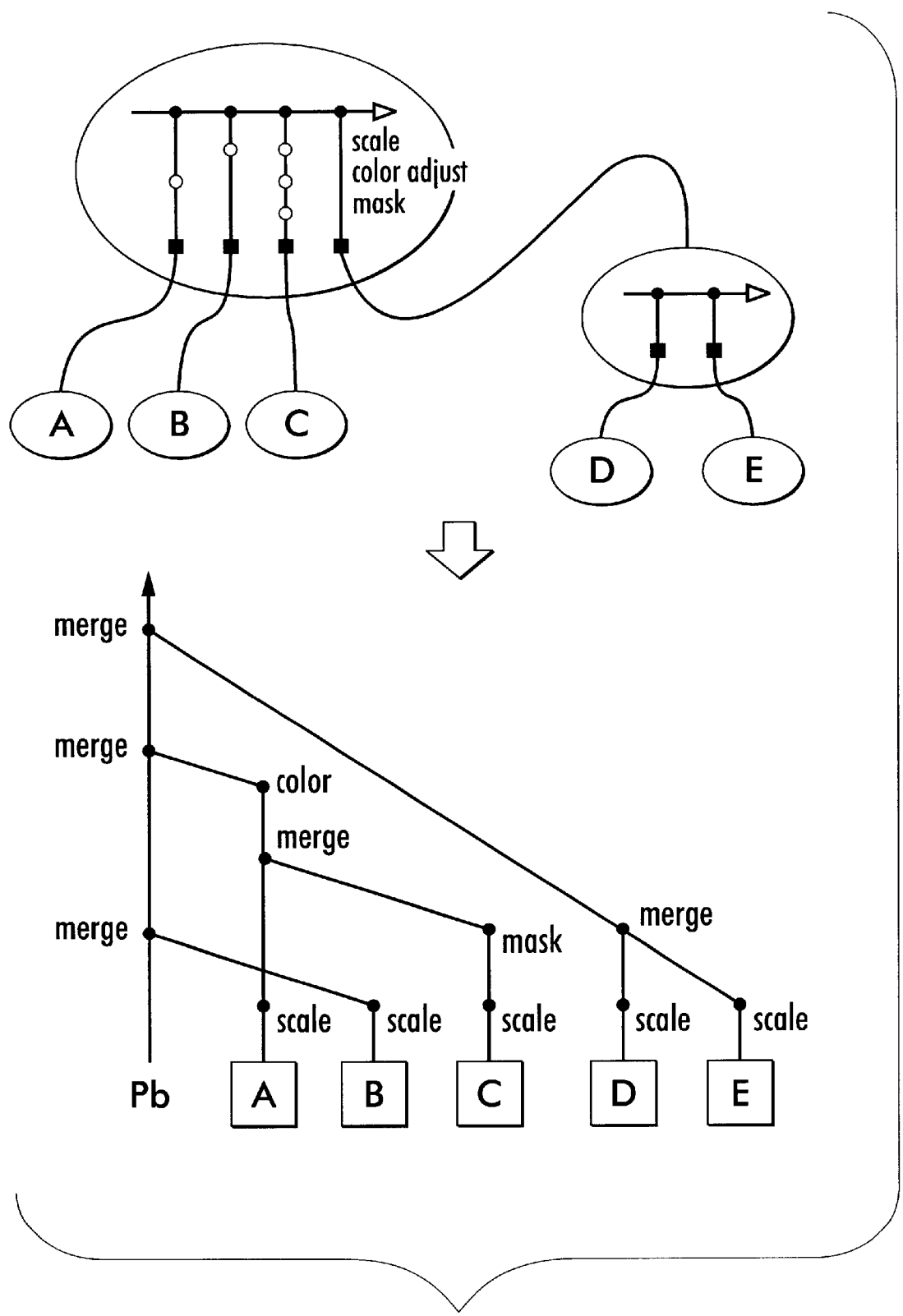
FIG. 17 is a graphic representation showing Processing-tree rendering in accordance with the invention.

A Processing-tree is a directed acyclic graph of image processing commands that is device dependent and resolution dependent (see FIG. 17). A Processing-tree is generating by expanding the SID associated with all nested SIs into a single SI, then applying device dependent information to convert all coordinates and dimensions into absolute, device dependent values. Data contents pointed to by representation entries are rendered into rasters. Since the Processing-tree is device dependent and resolution dependent, the IPOs can be optimized for processing speed by a variety of optimizing techniques that are understood by those skilled in the art. For example, the user may combine two scale and one rotate operation into one affine operation, thereby combining conforming cascaded operations into affine. In essence, why perform three separate operations when they may be combined into one to improve processing speed.

The output image is then rendered by a simple traversal of the resulting Processing-tree. This can be thought of as a "compilation" of an object tree. Processing-tree rendering is especially suited for rendering of very large output images that are typical in document printing. The image processing optimization can decrease the time required for rendering significantly.

D. Example of Structured Imaging

Figure 18:
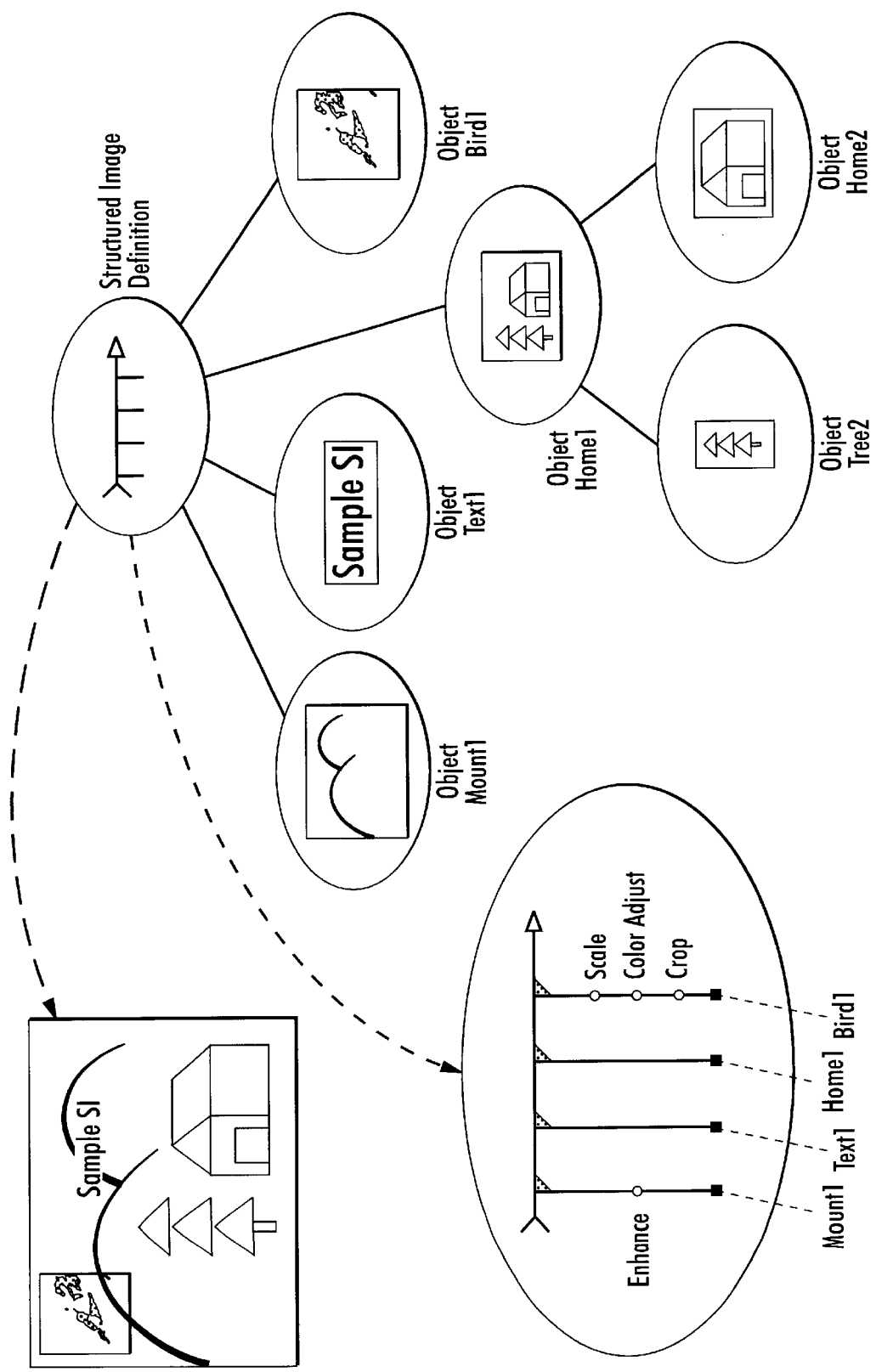
FIG. 18 provides a sample SI with associated SID file graphically displayed in accordance with the invention.

The SI shown in FIG. 18, is briefly described below. This descriptive example is written using the SIDL as described above.

The top level SI in this composite comprises four components:

1) mountain image-raster image object (Mount1);
2) "Sample . . . "-text object (Text1);
3) tree and house-IPD (Home1); and
4) bird image-bitmap raster object (Bird1);

The second level SI comprises two components:

1) tree graphics-graphics object (Tree2); and
2) house image-raster object (Home2).

For some applications, explicit descriptions of available representations are preferred. For this reason, the MR file format is defined. This file format currently uses syntax similar to the SIDL.

D2. SpatialTransform Image Processing Operation (IPO)

The only IPO specified within the SI format is the SpatialTransform IPO, which serves to perform linear spatial transformation on raster image contents. Examples include, rotation, scaling, and shearing. In general, the SpatialTransform IPO performs all affine transformations except translation (which is controlled through the Merge-Point and the ControlPoint attributes).

The parameters of SpatialTransform are as follows:

| Parameter | Value |
| --- | --- |
| Scale | 1 value for XY-scale (preserve a.r.) or 2 values for arbitrary scale (interpolation is application dependent- note: probably should be an argument) |

-continued

| Parameter | Value |
| --- | --- |
| Rotate | Angle (in degrees) |
| Shear | Shear Angle (in degrees) |
| Mirror | "X" or "Y" |
| TransformPoints | 3 pairs of corner points |
| Affine | Affine coefficients |
| FixedPoint | (x,y) relative to child being transformed - default values is the ControlPoint location |

The FixedPoint parameter allows the application of spatial transformations around a point of reference. For example, specifying a FixedPoint allows the user to rotate the object around the FixedPoint instead of rotating around the center of the object. In general, any supported spatial transformation can be defined to operate around FixedPoint. Since the FixedPoint is a parameter to SpatialTransform and is not part of the pasteboard, the IPO adjusts the ControlPoint automatically to ensure that the child object is merged into the parent pasteboard at the correct position. An example of how the ControlPoint is adjusted is described below.

E. A Second Example of Structured Image Generation

Importantly, SI is much more than a mere interactive editor. For instance, a high school yearbook printer has many individual pictures to prepare electronically for printing as a finished yearbook. In particular, photos must be scanned into the database, either individually (which is extremely time consuming) or technology exists where up to twelve photos may be scanned in at a time. Unfortunately, however, no matter how hard the user attempts to properly line up the individual pictures for scanning, there will always be slight deviations as a result of scanning. Usually each picture has a bar code or some other identifying feature to tie the picture to the name which will be printed under it.

Software exists that is capable of generating an SI automatically in the scanning situation described above. That is, an SI is created that identifies each individual child object (i.e., the individual pictures) and includes image processing operations to correct any misalignment, and properly configure each picture on the page with the appropriate text underneath (bar code reference). Such software is capable of scanning many objects at a time and each child object will be de-rotated/rotated for proper rendering at printing. Therefore, the yearbook printer can, at his option, pick only the child objects desired for placement on that particular page, line them up as desired, add appropriate text, and print. As discussed above, the child objects are referenced by bar code for call up.

Additionally, the yearbook printer may wish to create another SI by creating a template with "unbound" holes for the pictures and text as desired. The yearbook printer then binds the appropriate number of child objects to that template for printing. Importantly, however, the template can also have intelligent processing built in (i.e., background, etc.) that will automatically change color, cropping, special effects, and so forth.

F. Theme Generation

Figure 19:
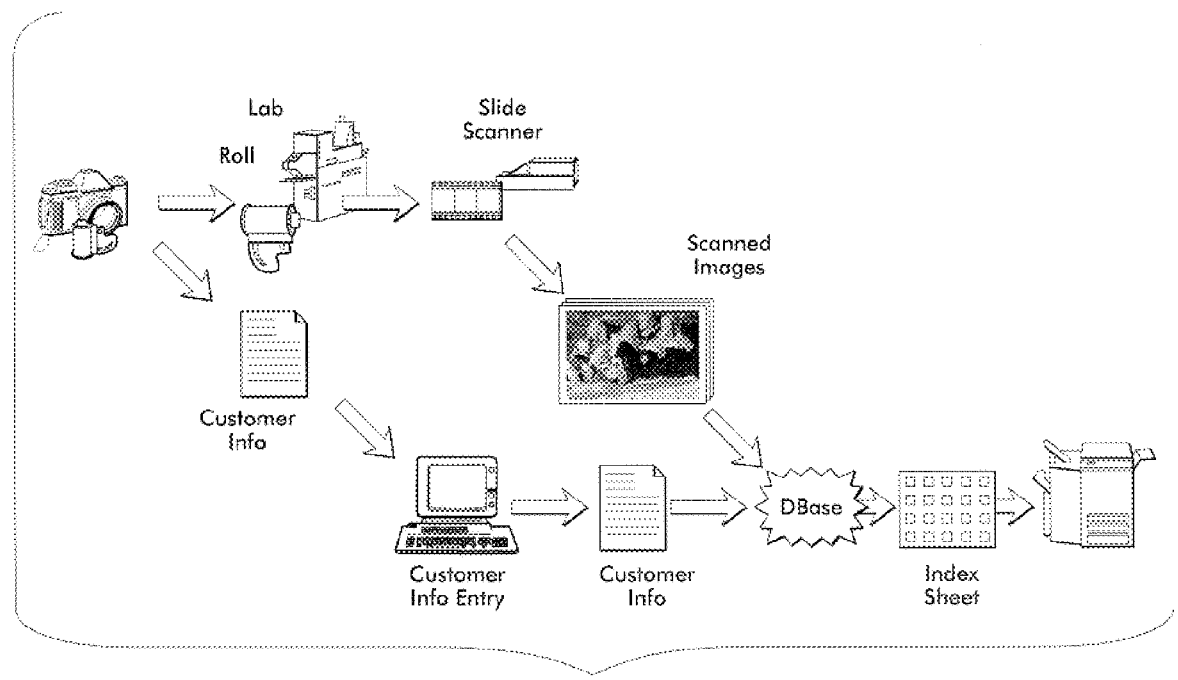
FIG. 19 illustrates the Loop 1 customer interaction and workflow process within an image production system.

Themes provide a means by which the background images, page templates, and signatures that define a custom photo album can be encapsulated within a full production systems framework, such as photofinishing systems. There are two types of customer interactions:

Loop 1: A customer brings in rolls of film to be processed and printed. The Developed roll is sent to scan manager for scanning. Independently, customer information is input into database. Once both scanned data and customer info is available, an index sheet containing small versions of all images on the roll will be printed automatically; see FIG. 19. An Index sheet is available in less than an hour.

Figure 20:
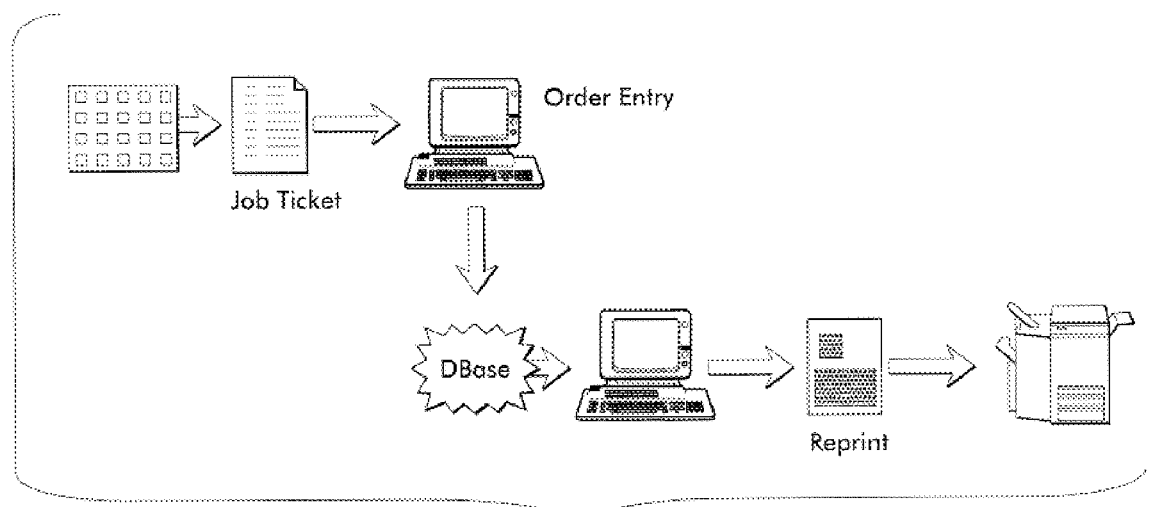
FIG. 20 illustrates the Loop 2 customer interaction and workflow process within an image production system related to Loop 1.

Loop 2: Referring to FIG. 20, the customer brings in index sheet from loop 1. The customer defines a job ticket indicating specific images to print, and in what document form. Document forms include single image reprints, custom calendars, school photo packs, theme books (e.g., anniversary, wedding, birthday, sporting event, . . . ), etc. The job ticket information is input into computer, and desired output is printed "while-u-wait".

In loop 2, a set of images are selected from the index sheet. The customer also must select a type of document to print. Types include calendars, school picture packs, photo albums, event books, and simple reprints. In each case, a basic template must exist which defines where selected images are to be placed on the printed page. Also, the templates must define any special background images associated with the document type. For example, party favor images for a birthday album. Also, it is likely that custom albums will be printed in a duplex manner, and possible, the printed pages will require folding to be complete. This requires that signature handling must be defined as well.

Theme encapsulates all aspects of a particular document type into a single entity. A Theme definition specifies:

| Name | Name of specific theme |
| --- | --- |
| description | Simple descriptive comment |
| set | Category of theme, e.g.: Occasions (b'day, anniversary, . . .) Calendars PicturePaks (school pictures) . . . |
| signature type | Identifies how many pages exist on a single side of printed paper, and identifies if printing is simplex or duplex. This information is a string such: 1S: 1 page/side, simplex 2S: 2 pages/side, simplex 2D: 2 pages/side, duplex 4D: 4 pages/side, duplex . . . |
| for each page template | Defines slots where customer-specified images are to be positioned. Also specifies fixed images and text. This is a Structured Image template. |
| background image | Name of a background image to use on current page. |
| background color | Color to use as background on current page. |
| drop shadow (or image frame) | Name of a frame type of drop shadow type to be used by images on current page. |

In the present production system, templates, background colors, drop shadows, and background images are referenced by name. There are mechanisms in place that convert these names to the appropriate values (RGB values for color, path name for files, and image processing operations for drop shadows).

Figure 21:
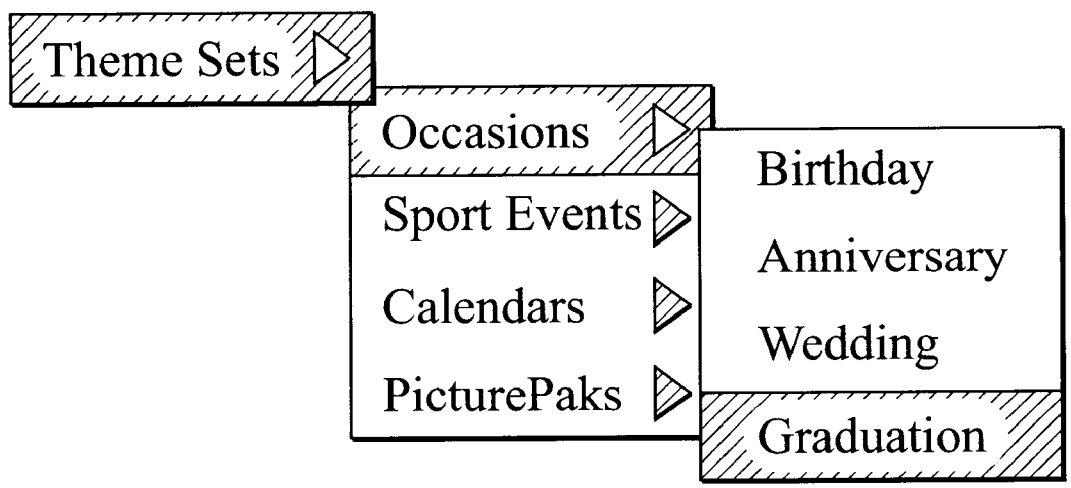
FIG. 21 illustrates a hierarchical menu applicable to customer theme selection.
Figure 22:
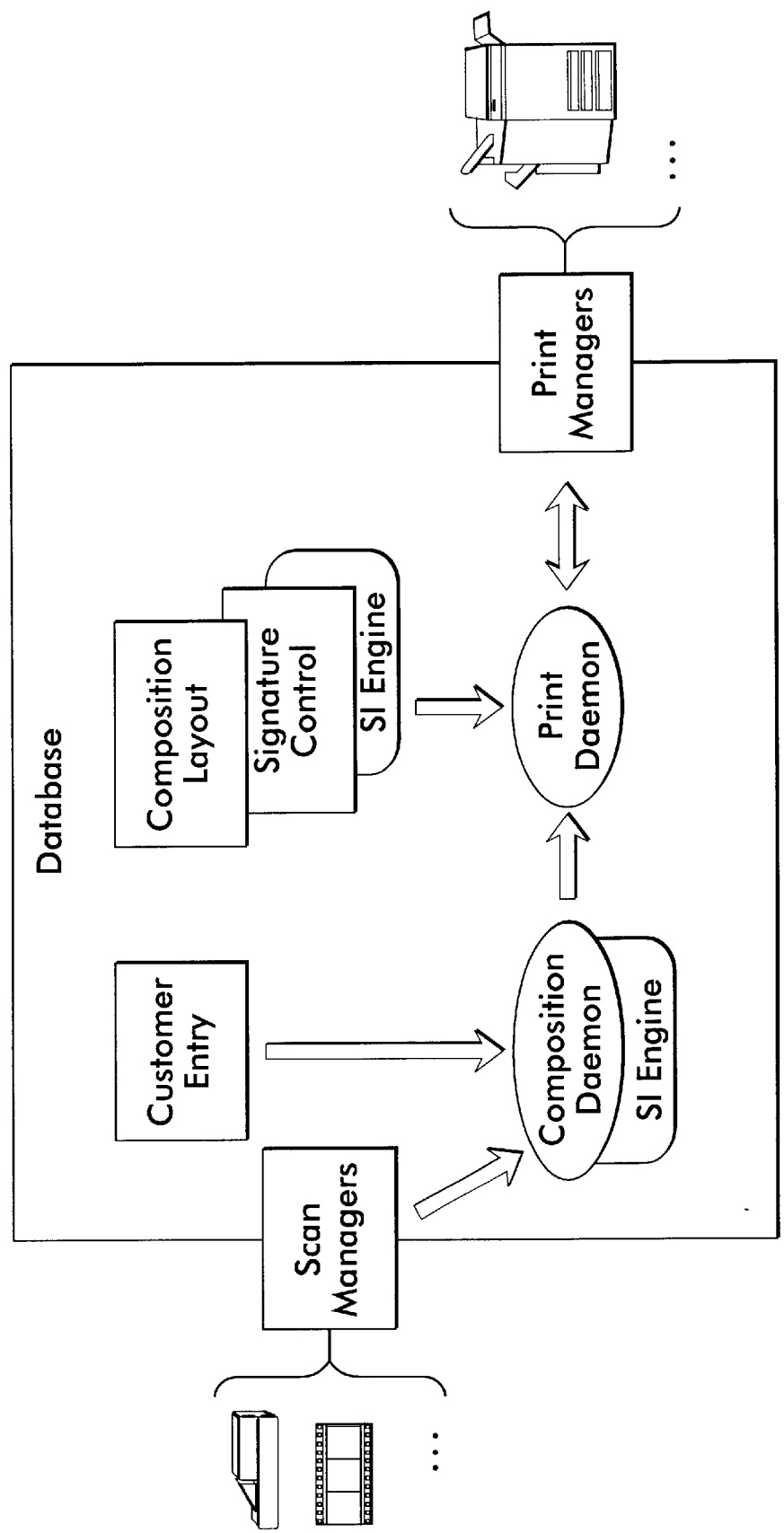
FIG. 22 illustrates a Customer Entry Database.

The set attribute of a theme is used to categorize various themes. One can think of this as hierarchical menus as shown in FIG. 21.

The signature type is used to specify which signature mechanism is to be used to construct this document. Supported signature types are defined is a system file. Signatures indicate how many pages are to be imaged onto each side of a sheet of paper. The code required to handle signatures also specifies the image processing operations necessary to rotate or flip images such that after folding, the image data is in the correct orientation.

The templates are Unbound and Incomplete Structured Images that define a set of "slots" to which the images specified from the job ticket will be bound. SI-based templates allow image slots to be defined, as well as text slots. Also, image processing operations can be attached to the slots. Also, both images and text can be permanently bound to a template to, for example, add a fixed icon to all pages. Further, SI templates have the capability to handle dynamic constraints through a built-in interpreted syntax. This allows the template to potentially adjust the size and position of the slots based on the actual image data to be rendered.

In the current implementation, a separate application was built to allow the interactive creation and editing of templates. This software not only allows the interactive and WYSIWYG creation of templates, it also allows custom modifications of existing templates.

Background images can be specified if the specific page template supports background images. Similarly, a background color can also be specified in the theme.

Finally, the type of drop shadow (or image frame) can be specified in the theme. In this implementation, drop shadows are specified by a name in the theme. A separate information file maps the drop shadow name into a series of image processing operations that will be performed by the Structured Image renderer as the page is being prepared.

In the current implementation, themes are defined in a set of files that are loaded at initialization time. Below is an example theme definition:

[Vacation]
Description: Vacation Photos
Signature: 1D
Set: Occasions
page: 8PA-Outside Vacation1.bkg
"RaisedShadowWindow-
page: 8PA-Inside Vacation2.bkg
"RaisedShadowWindow- In this example, the theme Vacation has a 1D signature, meaning 1 page per side, duplex printing. This theme is packaged with other themes that focus on Occasions. Two pages are defined for this theme. The first page uses the template entitled 8PA-Outside. This page will be printed with the image Vacation1.bkg as its background. Any customer images displayed on the first page will have a frame/drop shadow that is named RaisedShadowWindow. Finally, there is no background color specified. The second page uses the Vacation2.bkg as background, with the same drop shadow with no background color.

G. Conclusion

The foregoing inventive concept allows for the representation of complex color raster images as a collection of objects in a hierarchical and device independent format. Objects contributing to the output raster may originate from text, graphics, other rasters, or other SIs, and maintain their heritage for selectability and modification. An SI includes not only the source data, but also the image processing operations required for rendering them. SI technology supports reeditability, customization and enhancement, automatic image assembly, and high performance imaging (i.e., parallel, distributed, caching, etc). This provides a very powerful framework for describing images for later editing and reediting. SI, then, is a base technology capable of addressing the entire gamut of acquisition of objects, storage, edit/preparation and delivery/transmit to output rendering.

The present invention is directed to notion of themes which encapsulates many aspects of a particular image production system described herein to render images into a single entity. A Theme definition includes a signature definition, a set (organization of related themes, and a specific template, background image, or background color for each page. Definitions are, for the most part, loaded from text files at run-time.

What is claimed is:

1. A system for developing image themes with the use of an electronic structured image generator, comprising:

a) means for generating a representation of at least one raster image using at least one output structured image capable of being displayed and printed, said at least one output structured image being generated as a result of performing at least one image processing operation on at least one structured image object;

b) means for constructing and displaying at least one structured image, said structured image comprising a pasteboard having at least one adjustable image attribute, said at least one adjustable image attribute being dynamically configurable based upon a nature of said attribute, said pasteboard representing a frame onto which said at least one structured image object is rendered, and a structured image definition that describes a structured image formation process used to generate said at least one structured image, said structured image definition including at least one interconnected image processing operation performed on said at least one structured image object and merged to form said at least one output structured image;

c) means for controlling said generating means and for controlling said constructing and displaying means to form and modify said structured image definition including said at least one adjustable image attribute of said pasteboard, wherein said means for generating at least one output structured image in response to the structured image definition, including said at least one adjustable image attribute of said pasteboard, generated by said structured image constructing and displaying means is controlled by said means for controlling so as to generate said at least one output structured image; and d) means for at least one of displaying and printing said at least one output structured image in response to at least one of computer program instructions and operator inputted commands.

2. A method of developing image themes with the use of an electronic structured image generator, as claimed in claim 1 wherein said means for constructing and displaying further comprises:

a) means for providing a structured image syntax to a structured image renderer;

b) means for parsing said structured image syntax to construct a data structure representation of the structured image;

c) means for resolving unbound objects within said at least one output structured image;

d) means for optimizing processing of said at least one output structured image.

3. A process for developing an image representation based on themes with the use of an electronic structured image generator to electronically generate a representation of at least one image using structured images, comprising the steps of:

a) selecting at least one structured image object stored in a memory to be rendered onto a pasteboard, said pasteboard including at least one adjustable image attribute, said adjustable image attribute being dynamically configurable based upon a nature of said attribute, said at least one structured image object and said pasteboard defining at least one output structured image to be generated by a generation device;

b) selecting at least one image processing operation to be performed on said at least one structured image object to form at least a portion of a structured image definition used to generate said at least one output structured image;

c) generating the at least one output structured image in accordance with said at least one adjustable image attribute of said pasteboard; and d) at least one of displaying and printing said at least one output structured image responsive to at least one of computer program instructions and operator inputted commands.

4. A process for developing output images based on image rendering themes with the use of an electronic structured image generator, wherein the at least one output structured image comprises at least one structured image object that is rendered onto a pasteboard having at least one adjustable image attribute, said at least one structured image object being contained within a structured image definition, said structured image definition including at least one interconnected image processing operation performed on said at least one structured image object that is merged onto said pasteboard to form said at least one output structured image, said process comprising the steps of:

a) defining said at least one adjustable image attribute of said pasteboard;

b) selecting said at least one structured image object stored in a memory to be rendered onto said pasteboard and a component of said at least one output structured image to be generated by a generating device;

c) selecting at least one image processing operation to be performed on said at least one structured image object to form at least a portion of said structured image definition used to generate said at least one output structured image;

d) dynamically configuring said adjustable image attribute based upon a nature of said attribute;

e) generating the at least one output structured image by performing the at least one image processing operation on the at least one structured image object according to said structured image definition including said at least one adjustable image attribute of said pasteboard; and f) at least one of displaying and printing said at least one output structured image responsive to at least one of computer program instruction and operator inputted commands.

* * * * *